United States Patent
Zheng et al.

(10) Patent No.: US 10,766,599 B2
(45) Date of Patent: Sep. 8, 2020

(54) AIRCRAFT AND OUTER SHELL THEREFOR

(71) Applicant: PowerVision Robot Inc., Beijing (CN)

(72) Inventors: Weifeng Zheng, Beijing (CN); Hui Han, Beijing (CN); Yi Zheng, Beijing (CN); Buwei Wei, Beijing (CN); Guozhi Zeng, Beijing (CN)

(73) Assignee: PowerVision Robot Inc., Beijing (CN)

( * ) Notice: Subject to any disclaimer, the term of this patent is extended or adjusted under 35 U.S.C. 154(b) by 249 days.

(21) Appl. No.: 16/016,686

(22) Filed: Jun. 25, 2018

(65) Prior Publication Data
US 2018/0304984 A1    Oct. 25, 2018

Related U.S. Application Data

(63) Continuation of application No. PCT/CN2016/086095, filed on Jun. 17, 2016.

(30) Foreign Application Priority Data

Dec. 25, 2015    (CN) .......................... 2015 1 0997626

(51) Int. Cl.
*B64C 1/30*    (2006.01)
*B64C 25/10*    (2006.01)
(Continued)

(52) U.S. Cl.
CPC ................ *B64C 1/30* (2013.01); *B64C 25/10* (2013.01); *B64C 39/024* (2013.01); *B64D 47/08* (2013.01); *H04N 7/185* (2013.01); *B64C 25/26* (2013.01); *B64C 2201/024* (2013.01); *B64C 2201/027* (2013.01); *B64C 2201/042* (2013.01);
(Continued)

(58) Field of Classification Search
CPC ... B64C 25/10; B64C 39/024; B64C 2201/20; B64C 2201/027; B64C 2201/024; B64C 2201/108; B64C 39/00
See application file for complete search history.

(56) References Cited

U.S. PATENT DOCUMENTS 3,124,323 A * 3/1964 Frost ..................... B64C 39/001
                                                            244/12.2
3,135,481 A * 6/1964 Sudrow ............... B64C 29/0033
                                                            244/23 C
(Continued)

FOREIGN PATENT DOCUMENTS

CN        104260605 A       1/2015
DE    10 2005 046 155 A1    4/2007
(Continued)

OTHER PUBLICATIONS

PowerVision, PowerEgg: The Flying Egg-Shaped Drone, YouTube, Feb. 20, 2016, URL: https://www.youtube.com/watch?y=3fZHuGK6PR0, XP054978792.

*Primary Examiner* — Brian M O'Hara
*Assistant Examiner* — Keith L Dixon
(74) *Attorney, Agent, or Firm* — Winston Hsu

(57) ABSTRACT

An aircraft and an outer shell therefor. The aircraft includes an outer shell; and main body components, accommodated in the outer shell. The outer shell includes: an inner cavity, the inner cavity being provided with a space for at least accommodating the main body components of the aircraft; an outer surface, the outer surface enclosing the inner cavity.

17 Claims, 24 Drawing Sheets

(51) Int. Cl.
  *B64C 39/02*  (2006.01)
  *B64D 47/08*  (2006.01)
  *H04N 7/18*   (2006.01)
  *B64C 25/26*  (2006.01)

(52) U.S. Cl.
  CPC .. *B64C 2201/108* (2013.01); *B64C 2201/127* (2013.01); *B64C 2201/20* (2013.01)

(56) References Cited

U.S. PATENT DOCUMENTS

| | | | | |
|---|---|---|---|---|
| 3,387,801 | A * | 6/1968 | Kelsey | B64C 39/06 244/23 C |
| 3,863,869 | A * | 2/1975 | Bachman | B64C 29/04 244/23 D |
| 9,102,407 | B2 * | 8/2015 | Greenyer | B64C 33/02 |
| 10,494,081 | B2 * | 12/2019 | Alley | B64C 5/12 |
| 2005/0178920 | A1 * | 8/2005 | Wilson | F03H 99/00 244/171.5 |
| 2012/0267472 | A1 | 10/2012 | Pratzovnick | |
| 2016/0096613 | A1 * | 4/2016 | Johnson | B64C 29/04 244/13 |
| 2016/0159468 | A1 * | 6/2016 | Harris, III | B64C 25/66 244/102 R |
| 2018/0057160 | A1 * | 3/2018 | Robertson | B64C 25/32 |
| 2018/0057162 | A1 * | 3/2018 | Robertson | B64C 27/54 |

FOREIGN PATENT DOCUMENTS

| | | |
|---|---|---|
| ES | 2 354 796 A1 | 3/2011 |
| WO | 2015/149000 A1 | 10/2015 |
| WO | 2017/205997 A1 | 12/2017 |

\* cited by examiner

AIRCRAFT AND OUTER SHELL THEREFOR

CROSS REFERENCE TO RELATED APPLICATIONS

This application is a continuation application of and claims the priority benefit of a PCT application serial number PCT/CN2016/086095, filed on Jun. 17, 2016. The entirety of the above-mentioned patent application is hereby incorporated by reference herein and made a part of this specification.

BACKGROUND OF THE INVENTION

1. Field of the Invention

The invention relates to an aircraft, and especially to an unmanned aerial vehicles, and an outer shell for the aircraft.

2. Description of the Prior Art

Aircrafts are more and more widely used in various social and industrial activities. It is a significant research aspect to offer agile and convenient designs for aircrafts.

SUMMARY OF THE INVENTION

In an embodiment, an aircraft includes: an outer shell; and main body components, accommodated in the outer shell.

It is optional that the outer shell in the embodiment is provided in a form of an ellipsoid or a sphere.

It is optional that the main body components in the embodiment include an aircraft framework.

It is optional that the aircraft in the embodiment further includes mechanical arms. For example, the mechanical arm can expand and retract relative to the outer shell. For another example, installation positions of the mechanical arms are distributed around a gravity center axis of the aircraft.

It is optional that the outer shell in the embodiment includes an inner cavity and an outer surface. The outer surface forms a first opening for a mechanical arm of the aircraft to expand and retract relative to the outer shell. The main body components include a first installation mechanism that is located at the first opening and allows variation of the angle of the mechanical arm relative to a gravity center axis of the aircraft. For example, the outer surface includes a plurality of the first openings. The first openings pass through the outer surface of the outer shell. The first openings are distributed around the aircraft in equal central angles. For another example, the main body components include a first controlling component. The first controlling component is configured to generate a first expanding signal, for driving the mechanical arm to expand out, and a first retracting signal, for driving the mechanical arm to retract back, to the first installation mechanism. The first controlling component generates the first expanding signal or the first retracting signal according to a flight status of the aircraft. For another example, the mechanical arm includes: an arm main body, the arm main body being installed on the first installation mechanism and being capable of being at least partially accommodated in the first opening when the mechanical arm is retracted; and an arm cover, the arm cover being installed on a side of the arm main body and being capable of at least partially covering the first opening when the mechanical arm is retracted.

It is optional that the outer shell in the embodiment includes an inner cavity and an outer surface. The outer surface forms a second opening for a leg of the aircraft to expand and retract relative to the outer shell. The main body components include a second installation mechanism that is located at the second opening and allows variation of the angle of the leg relative to a gravity center axis of the aircraft. For example, the outer surface includes a plurality of the second openings. The second openings pass through the outer surface of the outer shell. The second openings are distributed around the aircraft in equal central angles. For another example, the main body components include a second controlling component. The second controlling component is configured to generate a second expanding signal, for driving the leg to expand out, and a second retracting signal, for driving the leg to retract back, to the second installation mechanism. The second controlling component generates the second expanding signal or the second retracting signal according to a flight status of the aircraft. For another example, the leg includes: a leg main body, the leg main body being installed on the second installation mechanism and being capable of being at least partially accommodated in the second opening when the leg is retracted; and a leg cover, the leg cover being installed on a side of the leg main body and being capable of at least partially covering the second opening when the leg is retracted. For another example, the aircraft further comprises a gimbal camera. The leg is disposed to be kept away from a shooting view of the gimbal camera after a flight height of the aircraft is not less than a threshold.

In an embodiment, an outer shell of an aircraft has: an inner cavity, the inner cavity having a space for at least accommodating main body components of the aircraft; and an outer surface, the outer surface enclosing the inner cavity.

It is optional that the outer surface in the embodiment is bounded by a closed envelope surface, and the envelope surface is formed by a smooth curved surface or a plurality of surfaces. For example, the smooth curved surface has a shape of an ellipsoid.

It is optional that the outer surface in the embodiment forms a first opening for a mechanical arm of the aircraft to expand and retract relative to the outer shell.

It is optional that the outer surface in the embodiment forms a second opening for a leg of the aircraft to expand and retract relative to the outer shell.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 1A, FIG. 1B, FIG. 2 and FIG. 3. In an embodiment, an aircraft includes an outer shell 2. The outer shell 2 has an inner cavity 2a and an outer surface 2b. The inner cavity 2a has at least an accommodating space which accommodates main body components of the aircraft.

The outer surface 2b encloses the inner cavity 2a and is bounded by a closed envelope surface. Therein, that the outer surface 2b is bounded by the closed envelope surface does not mean that the outer surface 2b is necessary to be closed but that the envelope surface is closed. Furthermore, the bounding of the envelope surface to the outer surface 2b makes the shape of the outer surface 2b tend to be closed as the envelope surface is. In other words, the outer surface 2b can be configured to totally or partially coincide with the envelope surface.

Figure 1A:
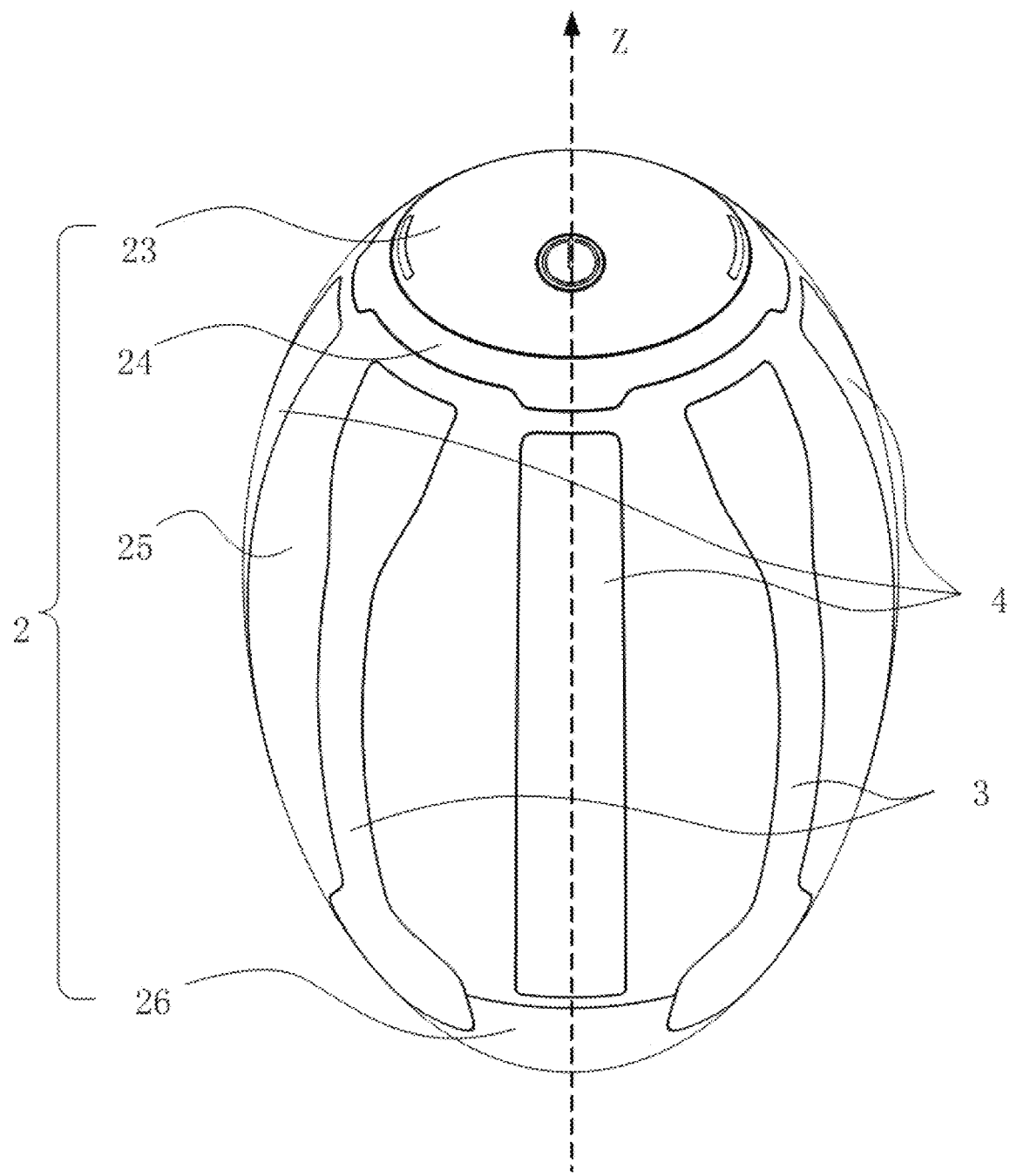
FIG. 1A is a perspective view of an aircraft when the aircraft is retracted.
Figure 1B:
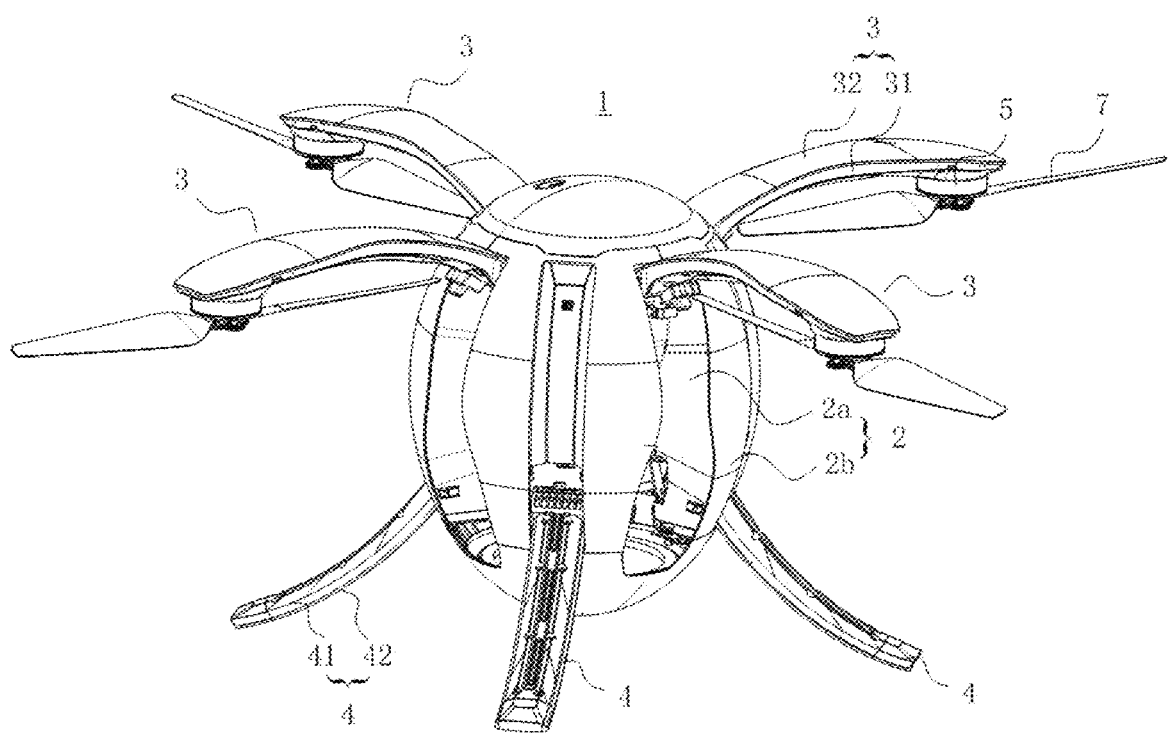
FIG. 1B is a perspective view of the aircraft in FIG. 1A when the aircraft is expanded.
Figure 2:
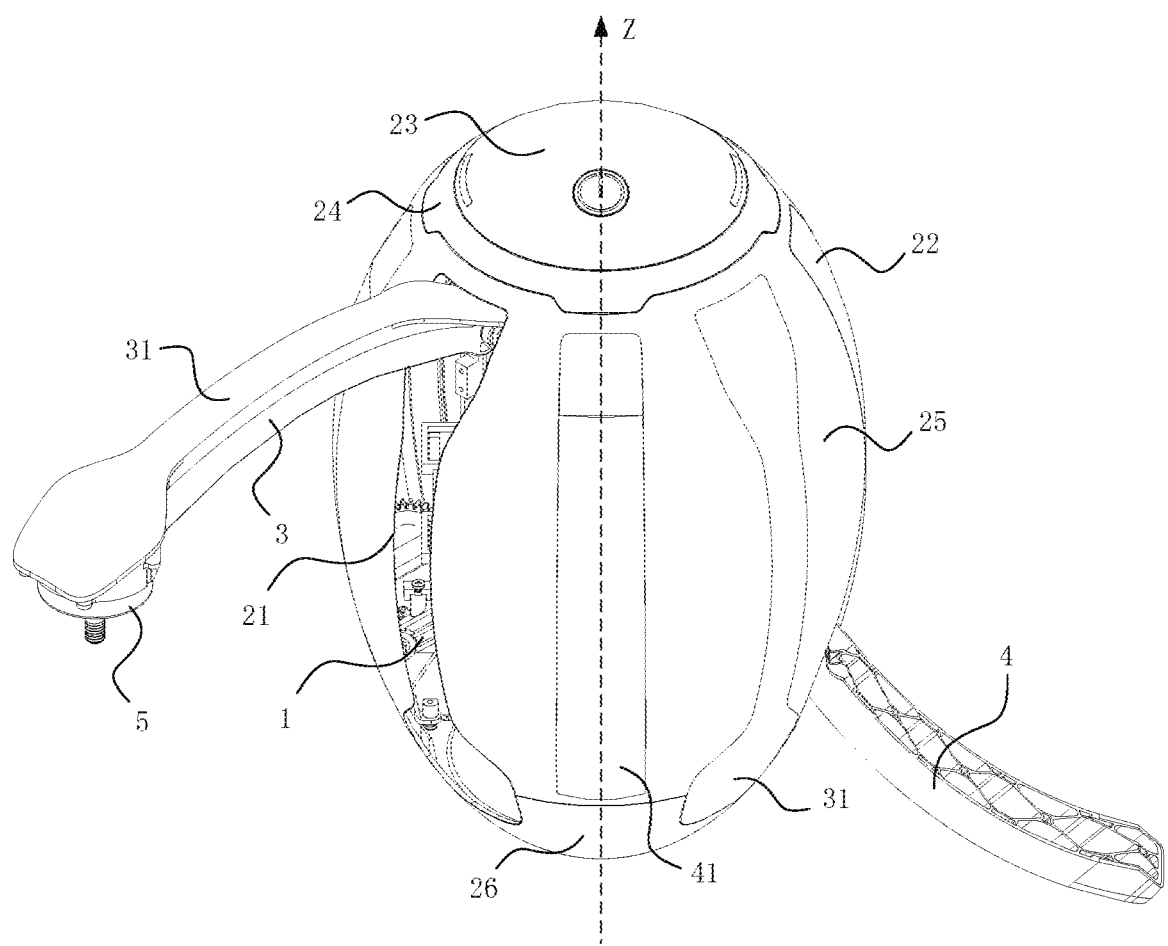
FIG. 2 is a perspective view of the aircraft in FIG. 1A and FIG. 1B which the aircraft is partially expanded.

In FIG. 1A, FIG. 1B and FIG. 2, the envelope surface for bounding the outer surface 2b has a smooth curved surface shape of an ellipsoid. However, it does not mean that other smooth curved surface shapes excluding ellipsoids are inapplicable. For example, the envelope surface to the outer surface 2b can be a spherical surface. Furthermore, it also does not mean that non-smooth surfaces are inapplicable. For example, the envelope surface for bounding the outer surface 2b can be formed by a plurality of surfaces, furthermore, at least one of which can be a curved surface or a flat surface.

Please still refer to FIG. 1A, FIG. 1B, FIG. 2 and FIG. 3. In the embodiment, the aircraft also includes mechanical arms 3 and legs 4 which are capable of expanding and retracting relative to the outer shell 2.

For the case that the envelope surface bounding the outer surface 2b in the embodiment has the smooth curved surface shape of the ellipsoid, the major axis of the ellipsoid is parallel to a gravity center axis of the aircraft (as shown by a dashed axis Z in FIG. 1A and FIG. 2). For example, the major axis of the ellipsoid coincides with the gravity center axis of the aircraft. Furthermore, the mechanical arms 3 are installed near an end of the major axis of the ellipsoid; the legs 4 are installed near the other end of the major axis of the ellipsoid. Thereby, the variation of an angle of the mechanical arm 3 and the leg 4 relative to the aircraft due to expanding or retracting is based on the gravity center axis. Furthermore, the installation locations of the mechanical arms 3 and the legs 4 are near the two opposite ends respectively of the gravity center axis of the aircraft (e.g. the installation locations the mechanical arms 3 being distributed around the upper portion of the dashed axis Z, the installation locations the legs 4 being distributed around the lower portion of the dashed axis Z).

In addition, the ellipsoid has a first minor axis near the installation locations of the mechanical arms 3. The ellipsoid has a second minor axis near the installation locations of the legs 4. The first minor axis is longer than the second minor axis. That is, the outer surface 2b of the outer shell 2 bounded by the envelope surface of the ellipsoid shows a shape with a larger top portion and a smaller bottom portion. The curvature of the top portion is smaller than the curvature of the bottom portion. The shape shows an egg shape with its tip end facing downward. In this case, the distance between the gravity center of the aircraft and the installation location of the leg 4 in the direction of the major axis is smaller than the distance between the gravity center of the aircraft and the installation location of the mechanical arm 3 in the direction of the major axis, so that the probability of the aircraft rolling is reduced.

As shown by FIG. 1B and FIG. 2, the outer surface 2b forms first openings 21 for the mechanical arms 3 to expand and retract relative to the outer shell 2, and second openings 22 for the legs 4 to expand and retract relative to the outer shell 2.

In FIG. 1A, FIG. 1B and FIG. 2, the first openings 21 and the second openings 22 are formed by through holes passing through the outer surface 2b of the outer shell 2. However, it does not mean that other types of openings are inapplicable. For example, the first openings 21 and the second openings 22 can be formed by recesses which at least partially accommodate the mechanical arms 3 and the legs 4. In the case that the first openings 21 and the second openings 22 are formed by through holes, the mechanical arms 3 and the legs 4 can be totally accommodated in the inner cavity 2a of the outer shell 2 through the first openings 21 and the second openings 22.

Figure 3:
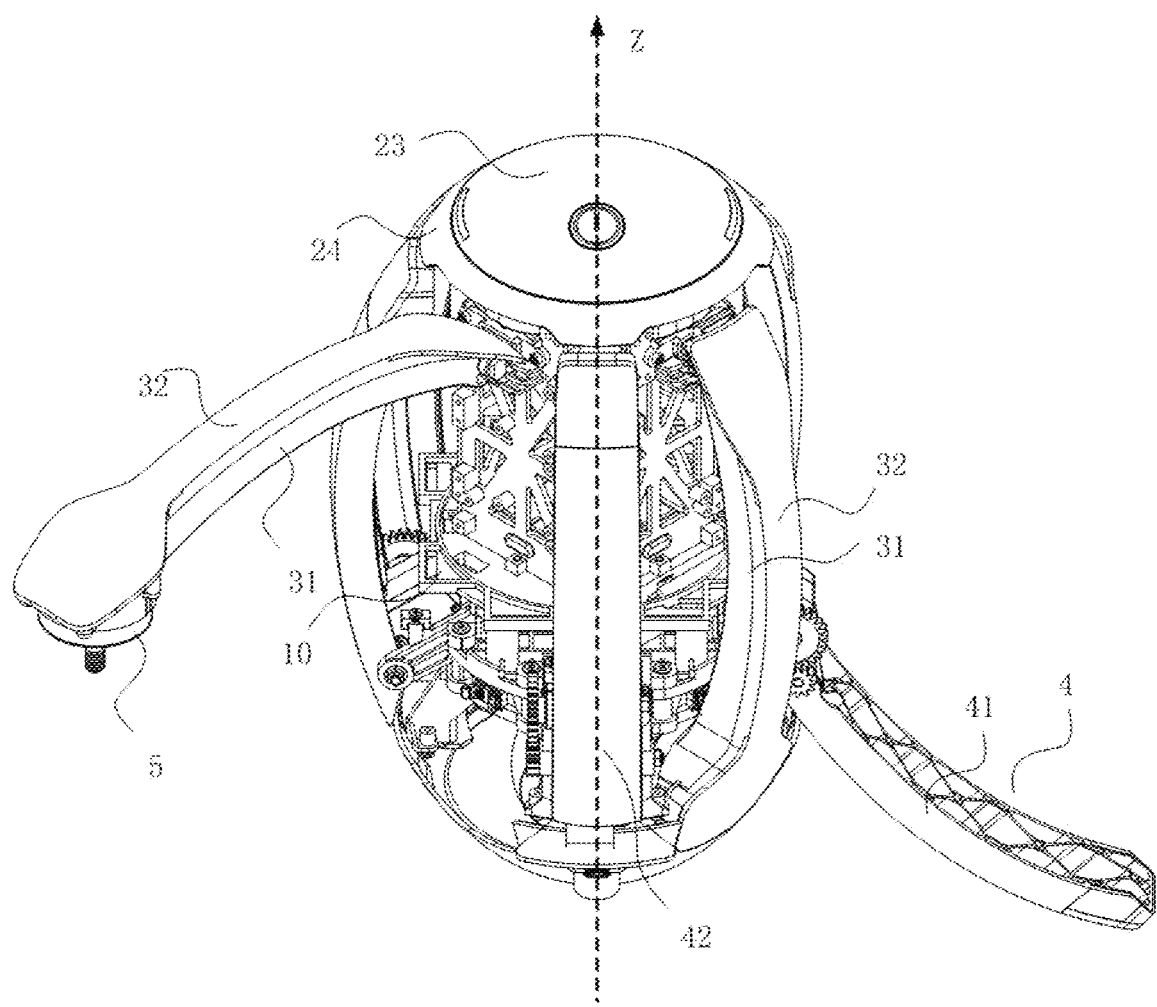
FIG. 3 is a perspective view of the aircraft in FIG. 2 of which an outer shell is partially shown.

For a better understanding of the variation of the angle of the mechanical arm 3 and the leg 4 relative to the aircraft due to expanding or retracting, please further refer to FIG. 2 and FIG. 3.

The mechanical arm 3 is rotatably installed to the main body components in the inner cavity 2a at the first opening 21. The mechanical arm 3 can expand from the first opening 21 out the outer surface 2b of the outer shell 2 or retract into the inner cavity 2a of the outer shell 2, resulting in a first degree of freedom of the mechanical arm 3. The leg 4 is rotatably installed to the main body components in the inner cavity 2a at the second opening 22. The leg 4 can expand from the second opening 22 out the outer surface 2b of the outer shell 2 or retract into the inner cavity 2a of the outer shell 2, resulting in a second degree of freedom of the leg 4.

In another aspect, an area of the outer surface 2b adjacent to the first opening 21 has a shape capable of being smoothly spliced with the mechanical arm 3 at a retracted status. An area of the outer surface 2b adjacent to the second opening 22 has a shape capable of being smoothly spliced with the leg 4 at a retracted status. Therefore, when the mechanical arms 3 and the legs 4 are at the retracted statuses, the outer surface 2b can be smoothly spliced with the mechanical arms 3 and the legs 4 so as to form the closed envelope surface.

Specifically, the mechanical arm 3 includes an arm main body 31 and an arm cover 32. The arm cover 32 is fixedly installed on a side of the arm main body 31 away from the interior of the outer shell 2. The arm cover 32 has a shape so that when the arm main body 31 retracts back to the outer shell 2, the arm cover 32 can close the first opening 21 along the envelope surface.

The leg 4 includes a leg main body 41 and a leg cover 42. The leg cover 42 is fixedly installed on a side of the leg main body 41 away from the interior of the outer shell 2. The leg cover 42 has a shape so that when the leg main body 41 retracts back to the outer shell 2, the leg cover 42 can close the second opening 22 along the envelope surface.

When the mechanical arm 3 and the leg 4 retract back to the outer shell 2, the outer curved surface of the arm cover 32, the outer curved surface of the leg cover 42, and the outer surface 2b of the outer shell 2 are spliced to form a shell with a closed curved surface. Therein, the closed curved surface is formed in a shape of an ellipsoid. The shape has the effect of protecting the components inside the aircraft, the mechanical arms, and the legs when the aircraft is not in use. The shape also facilitates the disposition of the aircraft of which the mechanical arms and the legs are retracted, which saves space for disposing the aircraft. In addition, the shape also can reduce the impact against the aircraft by an airflow from a side resulting in reduction on the probability of rolling.

In one aspect, the first openings 21 are distributed around the gravity center axis Z of the aircraft in equal central angles. In another aspect, the second openings 22 are distributed around the gravity center axis Z of the aircraft in equal central angles.

The quantities of the mechanical arms 3 and the first openings 21 and the quantities of the legs 4 and the second openings 22 are plurals. The mechanical arms 3 and the legs 4 are disposed to be staggered around the gravity center axis Z of the aircraft. The first openings 21 and the second openings 22 are disposed to be staggered around the gravity center axis Z of the aircraft. Furthermore, the mechanical arms 3, the legs 4, the first openings 21, and the second openings 22 are distributed around the gravity center axis Z of the aircraft in equal central angles. Furthermore, the amount of the mechanical arms 3 and the amount of the legs 4 are equal, and the amount of the first openings 21 and the amount of the second openings 22 are equal. Furthermore, in the embodiment, in the embodiment, the quantities of the mechanical arms 3, the legs 4, the first openings 21, and the second openings 22 are four.

Figure 1C:
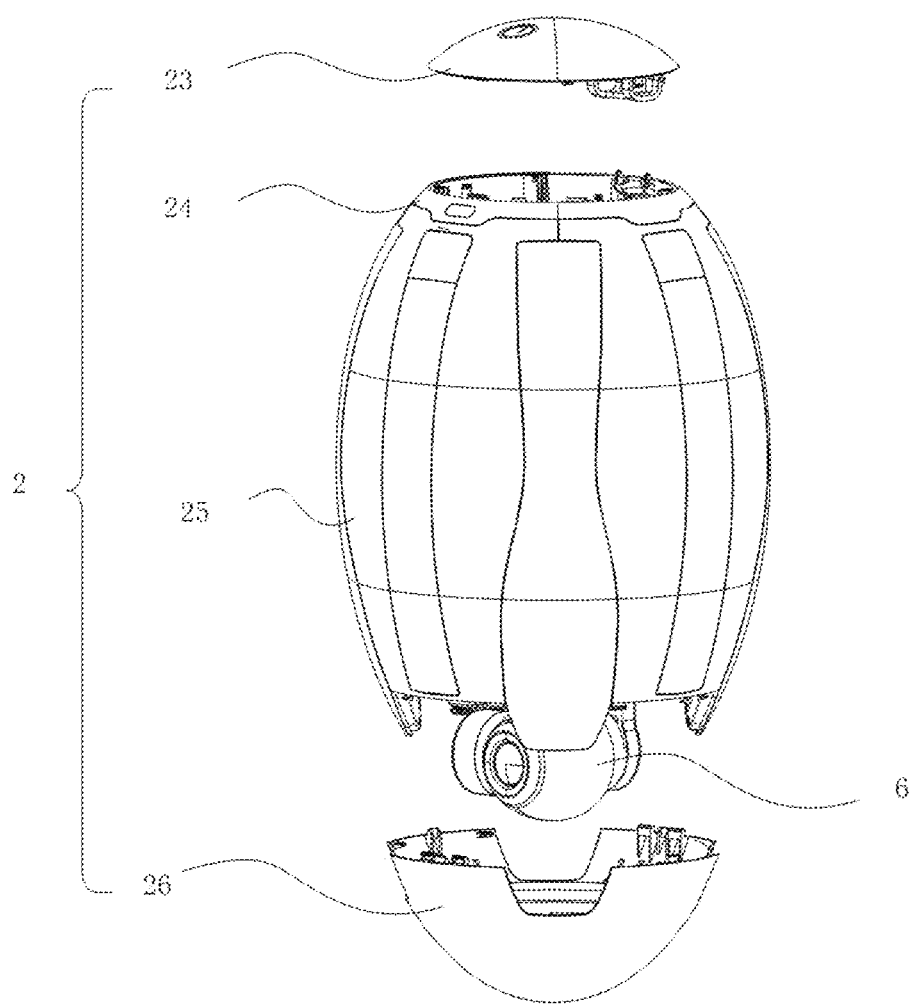
FIG. 1C is a perspective view of the aircraft in FIG. 1A when the aircraft is partially exploded.

As shown in FIG. 1C, it is optional that the outer shell 2 in the embodiment includes a top cover 23, an engagement ring 24, a periphery wall 25, and a bottom cover 26 in order in the gravity center axis Z of the aircraft. Therein, the periphery wall 25 has an upper opening and a lower opening. The top cover 23 is spliced with the periphery wall 25 through the engagement ring 24 at the upper opening. The bottom cover 26 is spliced with the periphery wall 25 at the lower opening. The first openings 21 and the second openings 22 are disposed on the periphery wall 25.

The main body of an aircraft in an embodiment includes the outer shell 2 and the main body components accommodated in the inner cavity 2a of the outer shell 2. The outer shell 2 has an outer surface 2b. The inner cavity 2a has at least an accommodating space which accommodates the main body components of the aircraft. The outer surface 2b encloses the inner cavity 2a and is bounded by a closed envelope surface. Therein, that the outer surface 2b is bounded by the closed envelope surface does not mean that the outer surface 2b is necessary to be closed but that the envelope surface is closed. Furthermore, the bounding of the envelope surface to the outer surface 2b makes the shape of the outer surface 2b tend to be closed as the envelope surface is. In other words, the outer surface 2b can be configured to totally or partially coincide with the envelope surface.

In an embodiment, an aircraft includes the main body mentioned above.

In another embodiment, the main body of an aircraft includes the outer shell 2 having the first opening 21, and the main body components accommodated in the inner cavity 2a of the outer shell 2.

It is optional that the main body in the embodiment further includes a first installation mechanism that is located at the first opening 21 and allows the variation of the angle of the mechanical arm 3 relative to the gravity center axis Z of the aircraft.

Therein, the first installation mechanism is used to allow the mechanical arm 3 to have a first degree of freedom for expanding from the first opening 21 out of the outer surface 2b of the outer shell 2 or retracting back to the inner cavity 2a of the outer shell 2.

Further, it is optional that the main body components in the embodiment include a first controlling component. The first controlling component is configured to generate a first expanding signal, for driving the mechanical arm 3 to expand out, and a first retracting signal, for driving the mechanical arm 3 to retract back, to the first installation mechanism.

For example, the first controlling component is further configured to generate the first expanding signal or the first retracting signal according to a flight status of the aircraft.

For another example, the first expanding signal is generated before the aircraft is enabled to fly; the first retracting signal is generated after the aircraft stops flying.

It is optional that the first opening 21 in the embodiment passes through the outer shell 2. The main body components include a framework 10 forming the first installation mechanism at the first opening 21.

In an embodiment, an aircraft includes the main body, of which the outer shell 2 has the first openings 21, and the mechanical arms 3.

It is optional that the mechanical arm 3 in the embodiment includes an arm main body 31 and an arm cover 32. The arm main body 31 is installed on the first installation mechanism and can be at least partially accommodated in the first opening 21 when the mechanical arm 3 is retracted. The arm cover 32 is installed on a side of the arm main body 31 and can at least partially cover the first opening 21 when the mechanical arm 3 is retracted. For example, the arm main body 31 can be further disposed to be totally accommodated in the first opening 21 when the mechanical arm 3 is retracted. The arm cover 32 can be further disposed to close the opening of the first opening 21 when the mechanical arm 3 is retracted. For another example, the arm cover 32 has a shape so that the arm cover 32 can be smoothly spliced with the outer surface 2b of the outer shell 2 when the opening of the first opening 21 is closed by the arm cover 32.

In another embodiment, the main body of an aircraft includes the outer shell 2 having the second openings 22, and the main body components accommodated in the inner cavity 2a of the outer shell 2.

It is optional that the outer surface 2b in the embodiment further forms the second opening 22 for the leg 4 of the aircraft to expand out or retract back relative to the outer shell 2. The main body further includes a second installation mechanism that is located at the second opening 22 and allows the variation of the angle of the leg 4 relative to the gravity center axis Z of the aircraft.

Therein, the second installation mechanism is used to allow the leg 4 to have a second degree of freedom for expanding from the second opening 22 out of the outer surface 2b of the outer shell 2 or retracting back to the inner cavity 2a of the outer shell 2.

Further, it is optional that the main body components in the embodiment include a second controlling component. The second controlling component is configured to generate a second expanding signal, for driving the leg 4 to expand out, and a second retracting signal, for driving the leg 4 to retract back, to the second installation mechanism.

For example, the second controlling component is further configured to generate the second expanding signal or the second retracting signal according to a flight height of the aircraft. For another example, the second retracting signal is generated after the flight height of the aircraft is not less than a threshold; the second expanding signal is generated after the flight height of the aircraft is less than the threshold.

It is optional that the second opening 22 in the embodiment passes through the outer shell 2. The main body components include a framework 10 forming the second installation mechanism at the second opening 22.

In an embodiment, an aircraft includes the main body, of which the outer shell 2 has the second openings 22, and the legs 4.

It is optional that the leg 4 in the embodiment includes a leg main body 41 and a leg cover 42. The leg main body 41 is installed on the second installation mechanism and can be at least partially accommodated in the second opening 22 when the leg 4 is retracted. The leg cover 42 is installed on a side of the leg main body 41 and can at least partially cover the second opening 22 when the leg 4 is retracted. For example, the leg main body 41 can be further disposed to be totally accommodated in the second opening 22 when the leg 4 is retracted. The leg cover 42 can be further disposed to close the opening of the second opening 22 when the leg 4 is retracted. For another example, the leg cover 42 has a shape so that the leg cover 42 can be smoothly spliced with the outer surface 2b of the outer shell 2 when the opening of the second opening 22 is closed by the leg cover 42.

In an embodiment, as shown by FIG. 1A to FIG. 1C, an aircraft includes the main body and the legs 4. Therein, the main body further includes a gimbal camera 6. The legs 4 are disposed to be kept away from the shooting view of the gimbal camera 6 after the flight height of the aircraft is not less than a threshold.

It is optional that the outer shell 2 in the embodiment includes the cover 26 for covering the gimbal camera 6.

Please refer to FIG. 1A, FIG. 1B, FIG. 2 and FIG. 3, in the embodiment, the main body includes the outer shell 2, which has the first openings 21 and/or the second openings 22, and the main body components accommodated in the inner cavity 2a of the outer shell 2. Correspondingly, in the embodiment, the aircraft includes the main body, and the mechanical arms 3 and/or the legs 4.

Therein, the main body components include at least the framework 10. In the embodiment, the main body components further include a controlling component and a battery. Therein, the framework 10 can be a structure with a cavity and has an accommodating space accommodating the controlling component and the battery. The battery and the controlling component are installed in the accommodating space of the framework. In addition, a motor 5 with a propeller 7 (shown in FIG. 1B) is installed on an end of the arm main body 31 far away a framework installation end of the arm main body 31. The controlling component is electrically connected to the motor 5 so as to control the rotation of the propeller 7. The battery is used for powering the controlling component and the motor 5. When the arm main body 31 is at an expanded status, the motor 5 is downward and drives the propeller 7 to rotate to produce downward thrust to make the aircraft rise and fly.

Figure 4:
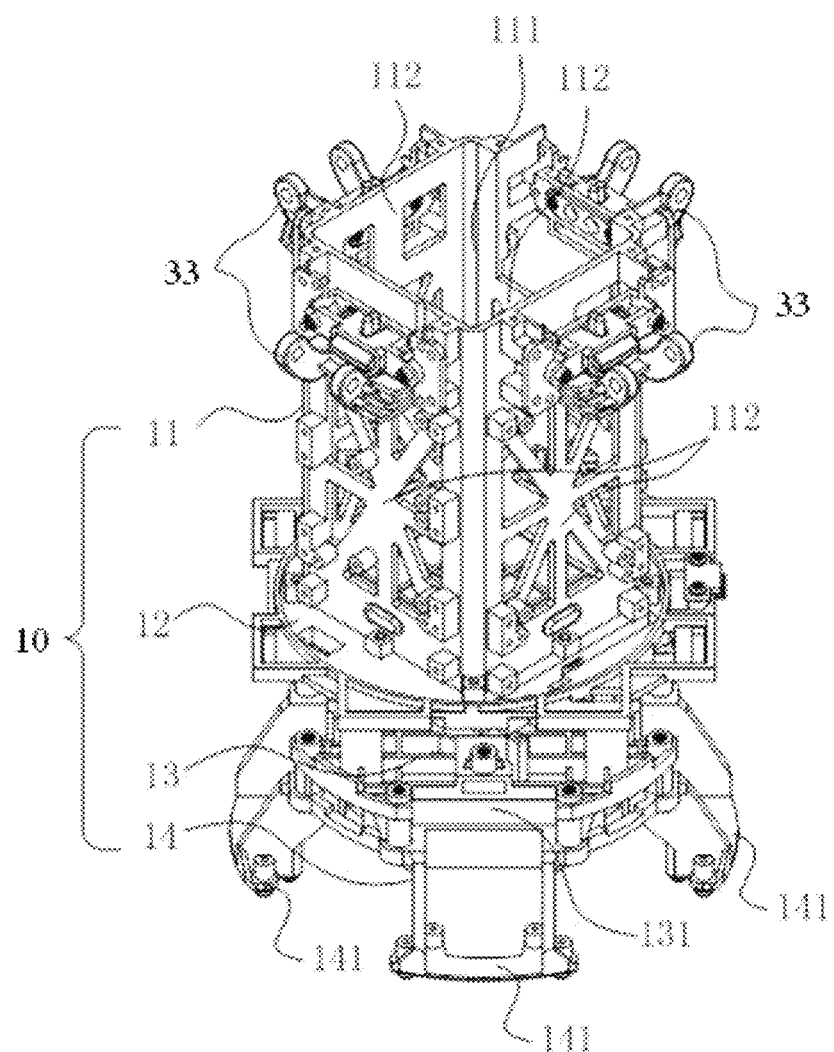
FIG. 4 is a perspective view of the structure of a framework in a first embodiment.

FIG. 4 shows the structure of the framework 10 used by the aircraft in a first embodiment. The framework 10 includes a first framework member 11, a second framework member 12, a third framework member 13, and a fourth framework member 14. The first framework member 11, the second framework member 12, the third framework member 13, and the fourth framework member 14 together construct the framework 10.

Figure 5:
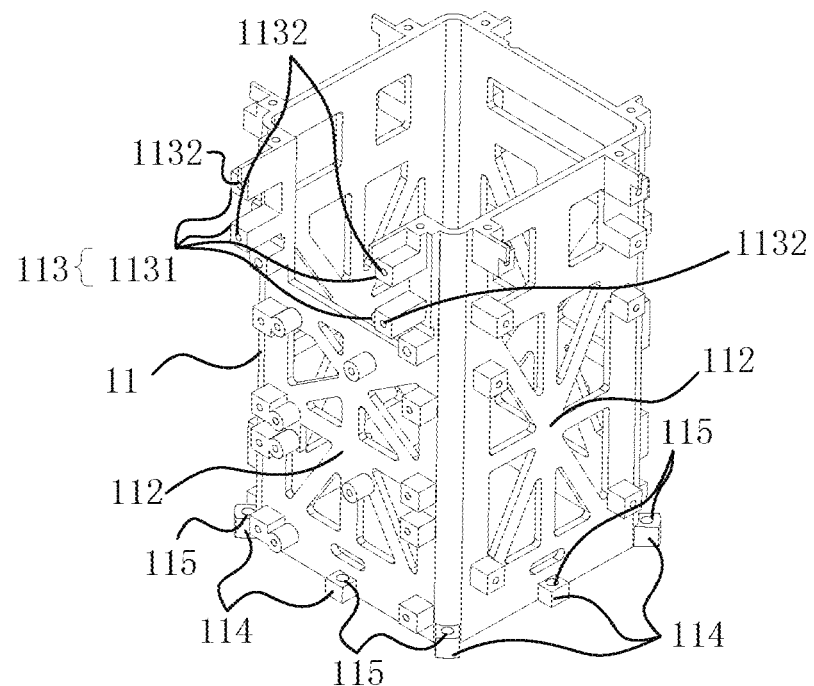
FIG. 5 is a perspective view of a first framework member of the framework in the first embodiment.

FIG. 5 shows a perspective view of the first framework member 11 of the framework 10. As shown by FIG. 5, the first framework member 11 has a cavity 111 and side walls 112 surrounding the cavity 111. The side wall 112 thereon forms the first installation mechanism. Therein, the first installation mechanism can include an arm mount 113 and an arm base 33 which are adjacent to the top side of the first framework member 11. The arm mount 113 includes a plurality of first protrusive blocks 1131 formed on the side wall 112 of the first framework member 11. The first protrusive block 1131 thereon forms a first installation hole 1132 for fixing the arm base 33. The arm base 33 is fixed on the arm mount 113 by fixing parts inserted into the first installation holes 1132, so that the arm base 33 is installed onto the framework structure of the aircraft through the arm mount 113. The arm base 33 thereon forms mechanical arm installation holes. The arm main body 31 is installed onto the arm base 33 through the mechanical arm installation holes and can expand and retract about the central axis of the mechanical arm installation holes. It is noticed that in FIG. 5, only the arm mount 113, the first protrusive blocks 1131, and the first installation holes 1132 on one side wall 112 are labeled. The other side walls 112 have the same structure as the above-mentioned side wall 112. In the embodiment, the fixing part is for example a bolt or a rivet.

Please refer to FIG. 5 continuously. The main body of the first framework member 11 is a long tubular structure with a cavity surrounded by the side walls 112. The side walls 112 have the same width so that the transverse section of the main body of the first framework member 11 is a regular polygon. The top side of the first framework member 11 also can be used to provide another outer shell installation location (which is used for installing the engagement ring 24 of the outer shell 2 and an upper portion of the periphery wall 25), in addition to the outer shell mount 141 of the fourth framework member 14 (which is used for installing the bottom cover 26 of the outer shell 2 and a lower portion of the periphery wall 25 thereon). The side wall 112 of the first framework member 11 is a structure with openings, which can reduce the weight of the first framework member 11.

Please refer to FIG. 4 continuously. The second framework member 12 is connected to the bottom side of the first framework member 11 and covers the opening of the cavity 111 at the bottom side of the first framework member 11.

Figure 6A:
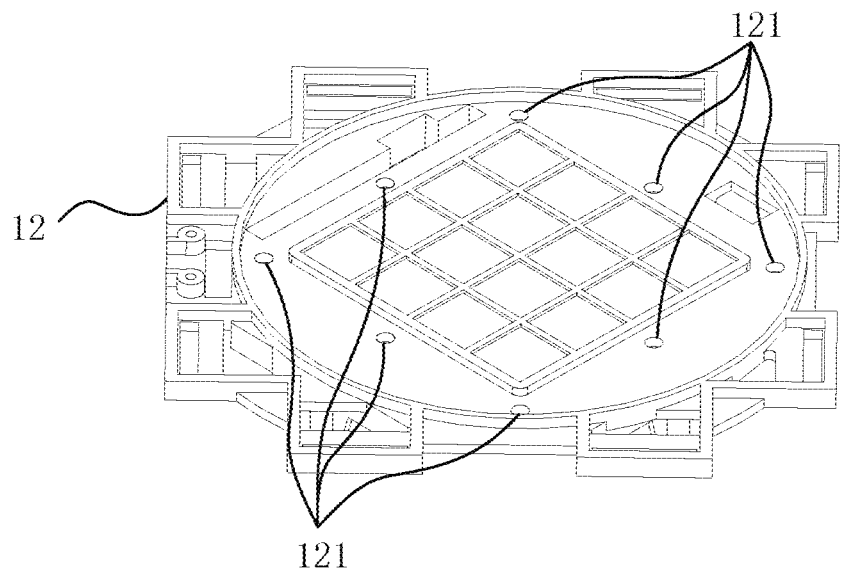
FIG. 6A is a perspective view of a second framework member of the framework in the first embodiment.
Figure 6B:
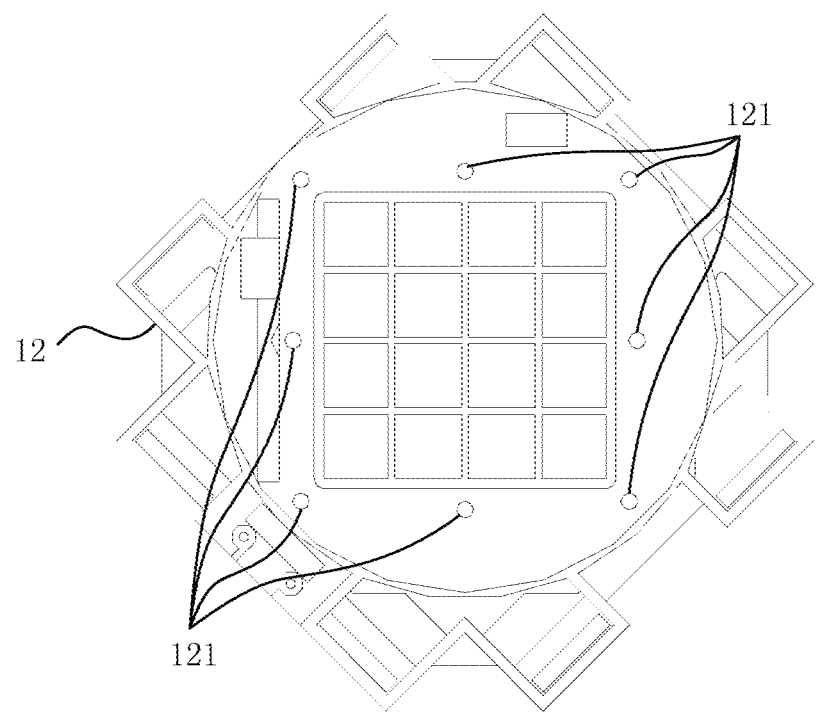
FIG. 6B is a top view of the second framework member in the first embodiment.
Figure 6C:
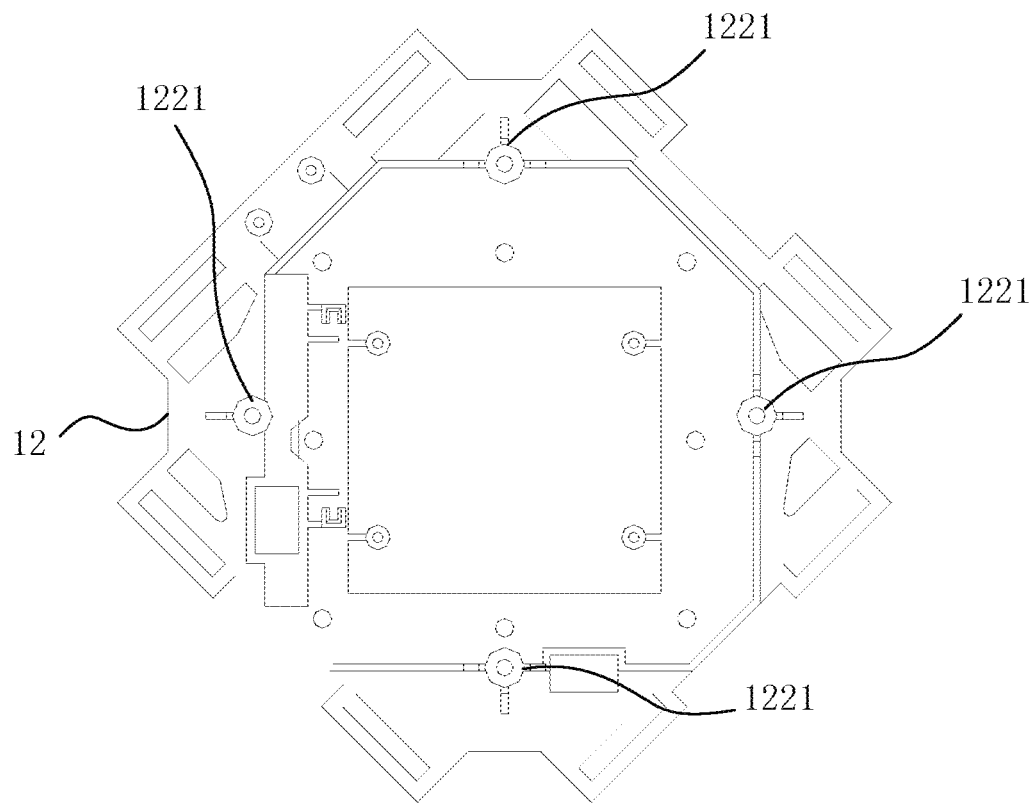
FIG. 6C is a bottom view of the second framework member in the first embodiment.

FIG. 6A shows a perspective view of the second framework member 12. FIG. 6B shows a top view of the second framework member 12. FIG. 6C shows a bottom view of the second framework member 12. As shown by FIG. 6A, FIG. 6B, FIG. 6C, and FIG. 5, the second framework member 12 has a top surface toward the first framework member 11 and a bottom surface toward a direction opposite to the first framework member 11. Therein, the top surface of the second framework member 12 is fixed on the bottom side of the first framework member 11. The side walls 112 of the first framework member 11 and the second framework member 12 together surround and form an accommodating cavity for electronic control equipment of the aircraft. A plurality of protrusive bosses 122 are disposed on the bottom surface of the second framework member 12.

As shown by FIG. 5, FIG. 6A, and FIG. 6B, the side wall 112 of the first framework member 11 forms a plurality of second protrusive blocks 114 aligned with the bottom side of the first framework member 11. The protrusive block 114 forms a second installation hole 115 on the surface of the protrusive block 114 that is aligned with the bottom side of the first framework member 11. The top surface of the second framework member 12 has a third installation hole 121 corresponding to the second installation hole 115. The second framework member 12 is connected to the bottom side of the first framework member 11 by a first connecting part inserted in both the second installation hole 115 and the third installation hole 121.

Figure 7A:
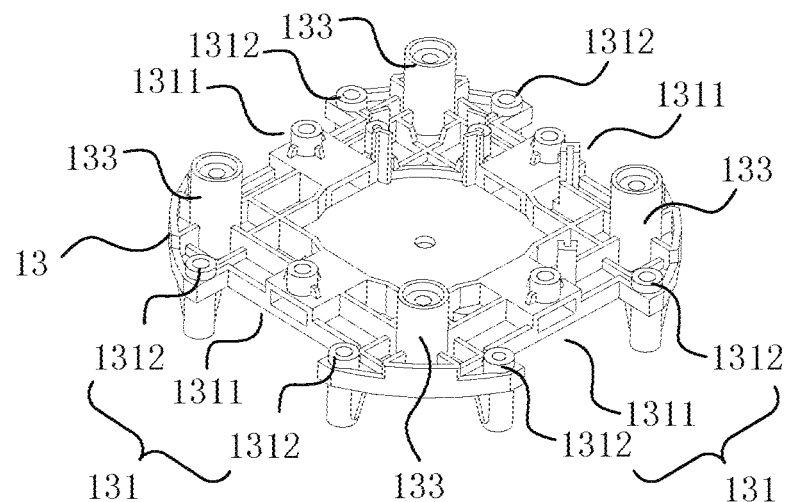
FIG. 7A is a perspective view of a third framework member of the framework in the first embodiment.
Figure 7B:
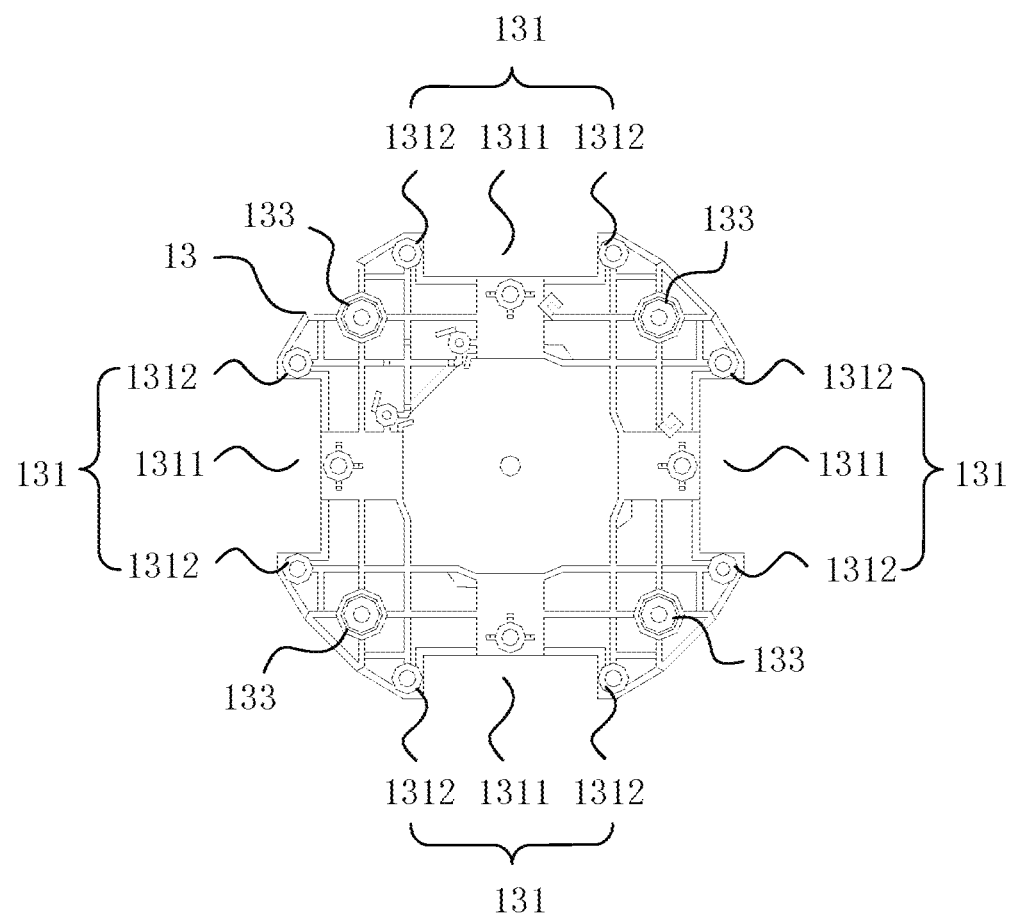
FIG. 7B is a top view of the third framework member in the first embodiment.
Figure 7C:
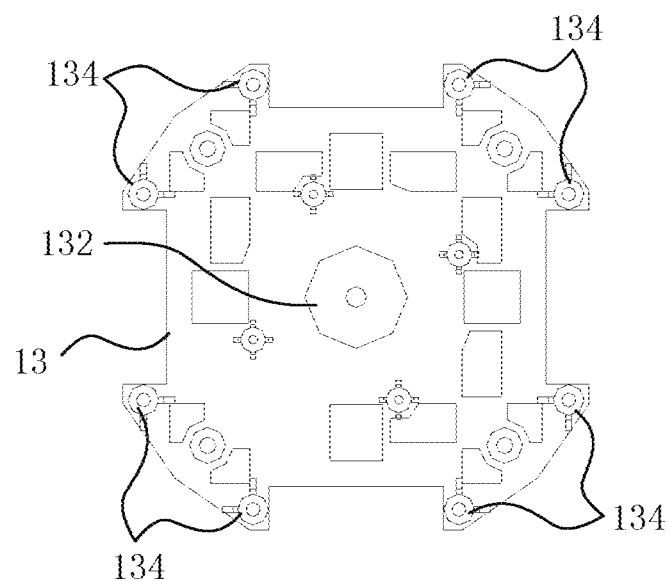
FIG. 7C is a bottom view of the third framework member in the first embodiment.

Please refer to FIG. 4 continuously. The third framework member 13 is connected to the bottom surface of the second framework member 12. The third framework member 13 forms the second installation mechanism at side edges. The second installation mechanism includes leg mounts 131 at the side edges of the third framework member 13. FIG. 7A shows a perspective view of the third framework member 13. FIG. 7B shows a top view of the third framework member 13. FIG. 7C shows a bottom view of the third framework member 13. The third framework member 13 has a socket 133 at the top side thereof for receiving the protrusive boss 122. A second connecting part of the third framework member 13 used for fixing the protrusive boss 122 in the socket 133 is connected to the bottom surface of the second framework member 12; that is, by the second connecting part fixing the protrusive boss 122 in the socket 133, the third framework member 13 is connected to the bottom surface of the second framework member 12.

Figure 8:
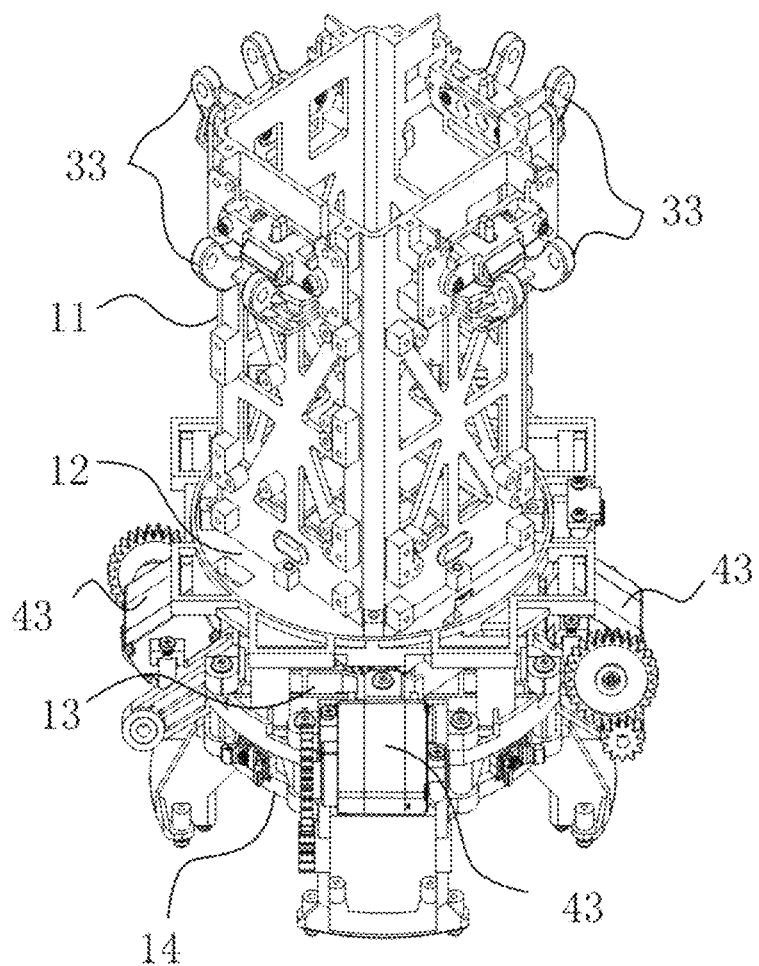
FIG. 8 is a perspective view of the framework on which a leg driving mechanism is installed in the first embodiment.

As shown by FIG. 7A and FIG. 7B, the leg mount 131 includes an indentation 1311 formed at the side edge of the third framework member 13, and installation bosses 1312 at the indentation 1311 for fixing the leg main body 41 and the leg driving mechanism 43. FIG. 8 shows the framework structure after the leg driving mechanism 43 is installed thereto.

In the embodiment, the protrusive boss 122 and the socket 133 have a larger height, so that after the third framework member 13 is connected to the second framework member 12, the third framework member 13 and the second framework member 12 reserve a larger space therebetween so as to satisfy the installation of the leg driving mechanism 43.

Figure 9A:
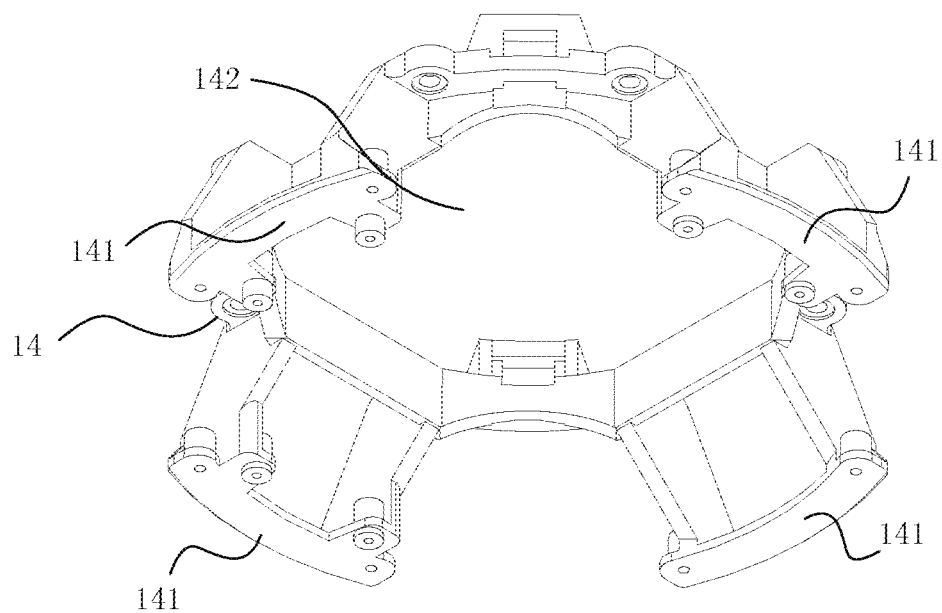
FIG. 9A is a perspective view of a fourth framework member of the framework in the first embodiment.
Figure 9B:
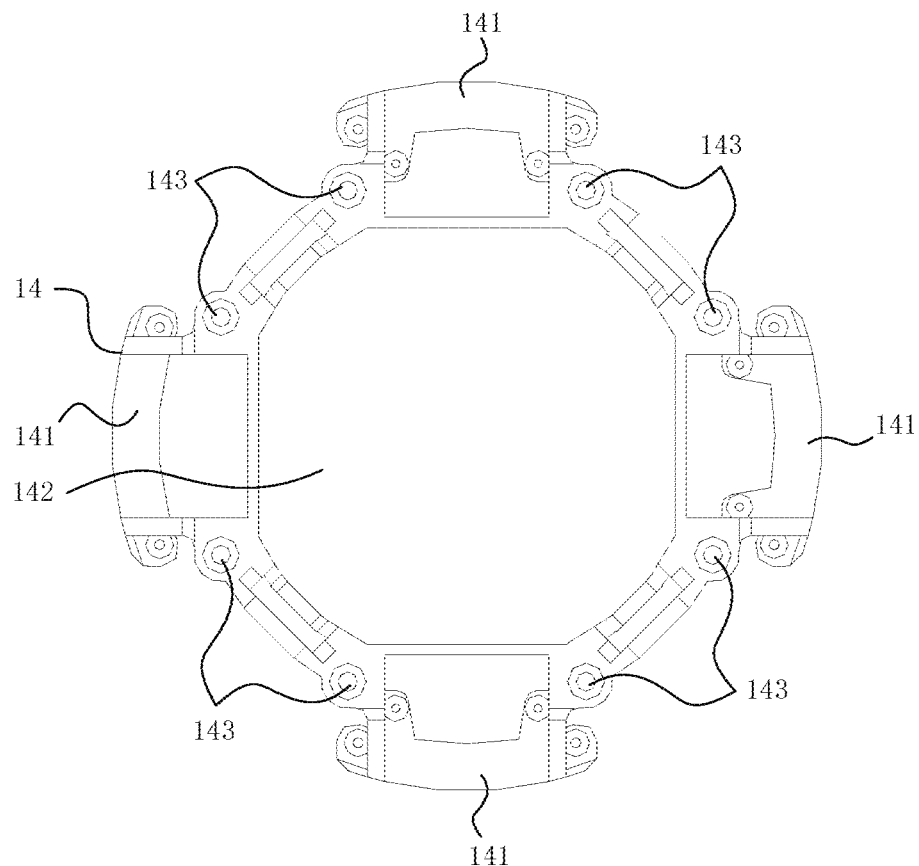
FIG. 9B is a top view of the fourth framework member in the first embodiment.
Figure 9C:
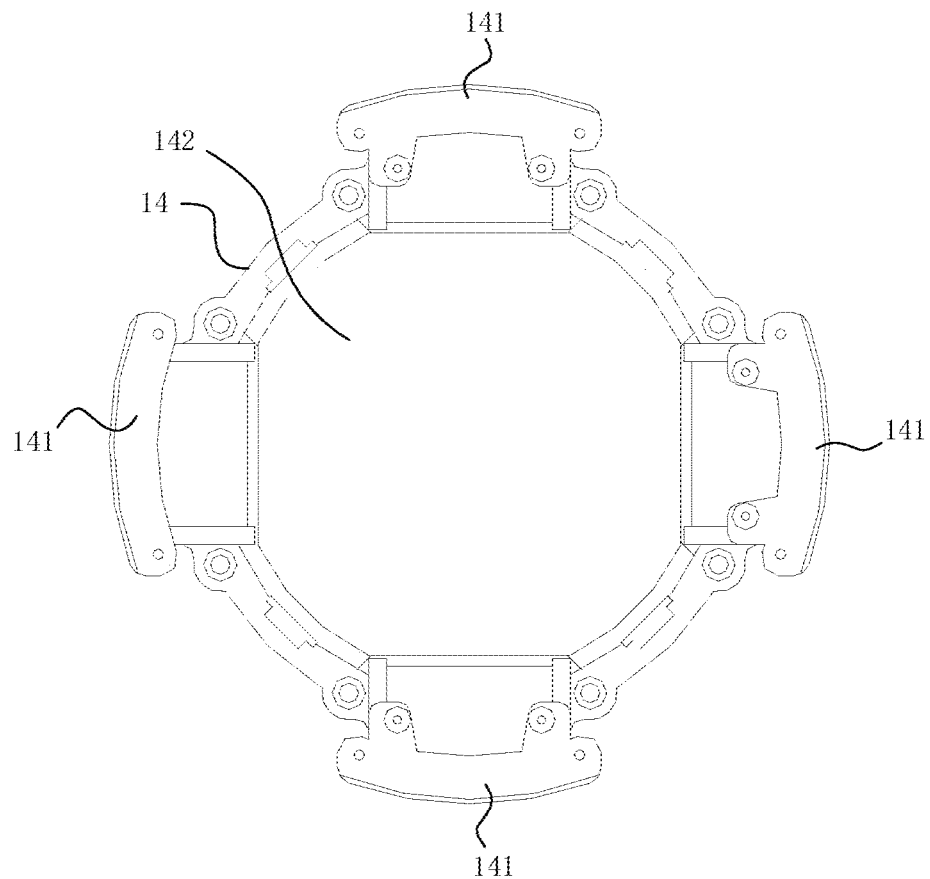
FIG. 9C is a bottom view of the fourth framework member in the first embodiment.

Please refer to FIG. 4 continuously. The fourth framework member 14 is connected to the bottom side of the third framework member 13. The fourth framework member 14 forms outer shell mounts 141 for installing the bottom cover 26 of the outer shell 2 and the lower portion of periphery wall 25 thereon. The amount of the outer shell mounts 141 is four. The outer shell mounts 141 are distributed for example around the major axis of the ellipsoid of the aircraft in equal central angles. FIG. 9A shows a perspective view of the fourth framework member 14. FIG. 9B shows a top view of the fourth framework member 14. FIG. 9C shows a bottom view of the fourth framework member 14.

As shown by FIG. 7C, FIG. 9A, FIG. 9B, and FIG. 9C, the third framework member 13 further forms a gimbal mount 132 on the bottom side thereof. The fourth framework member 14 further forms an opening 142 for exposing the gimbal mount 132. As shown by FIG. 7C and FIG. 9B, the third framework member 13 has bosses 134 on the bottom side thereof. The fourth framework member 14 has fourth installation holes 143 on the top side thereof corresponding to the bosses 134. The fourth framework member 14 is connected to the bottom side of the third framework member 13 by third connecting parts passing through the fourth installation holes 143 and being fixed on the bosses 134.

In the embodiment, the side walls 112, the arm mounts 113, the leg mounts 131, and the outer shell mounts 141 are equal in quantity; furthermore, the amount therefor is four.

The framework structure used in the aircraft achieves the integration of the mechanical arms, the legs, the control components, and the outer shell, so as to be as a whole. The framework structure also achieves the protection for the control components in the aircraft. When the mechanical arms and the legs retract back to the outer shell, the mechanical arms and the legs can approach the framework structure so that the space occupied by the aircraft is reduced. When the aircraft is not in use, the aircraft occupying the reduced space can avoid damage of breaking the mechanical arms and the legs by accident.

Figure 10A:
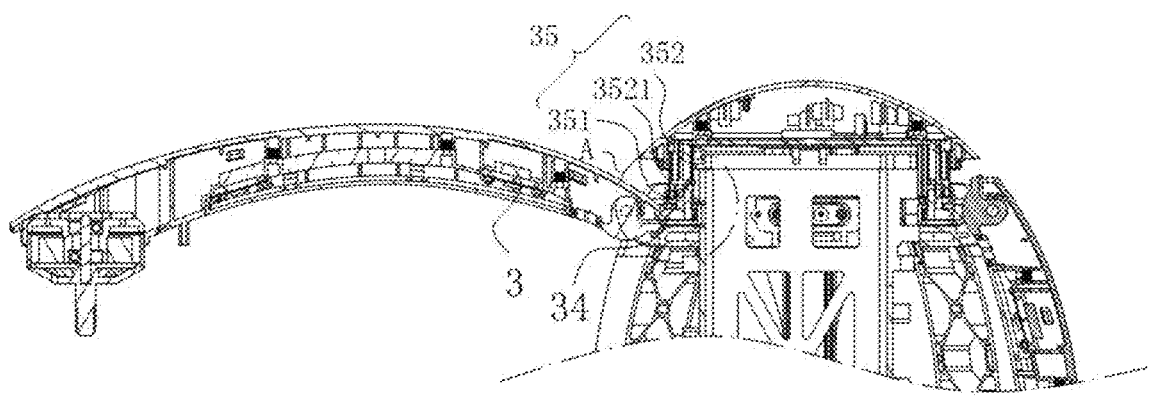
FIG. 10A is a sectional view of an arm unlocking mechanism of the aircraft in the first embodiment.
Figure 10B:
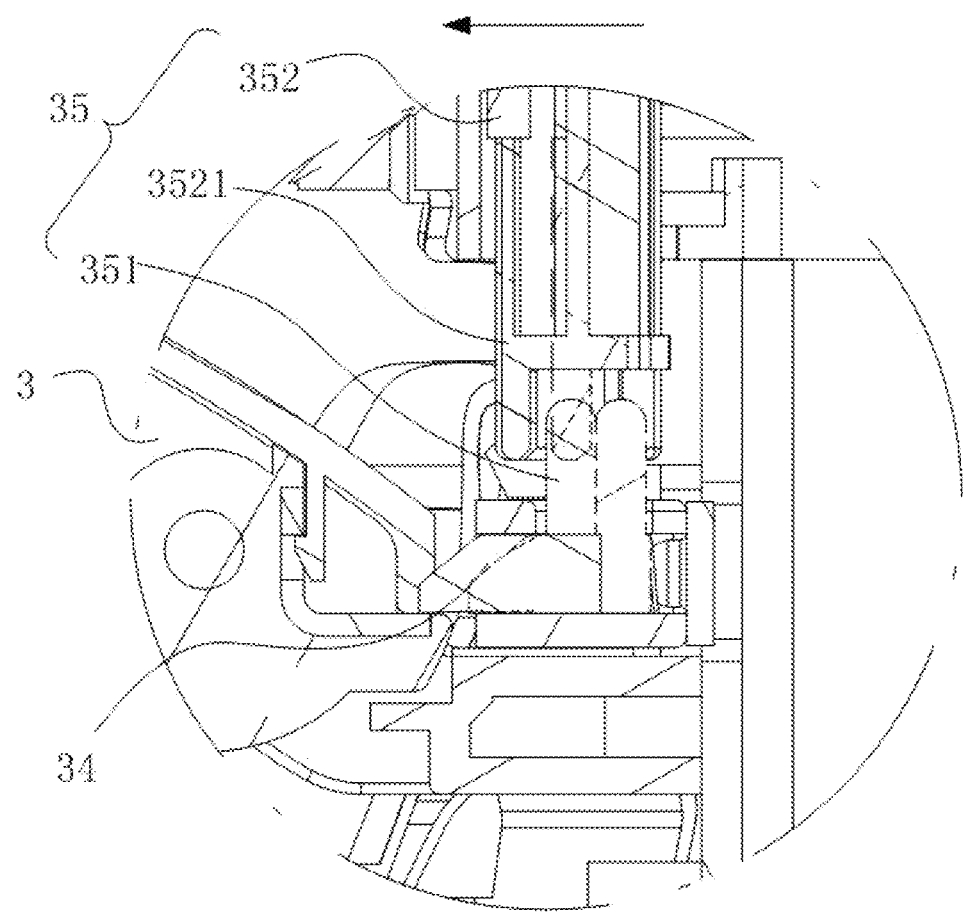
FIG. 10B is an enlarged view of the structure enclosed by the area A in FIG. 10A.

The first installation mechanism can further include an arm locking mechanism and an arm unlocking mechanism. FIG. 10A shows a sectional view of the arm unlocking mechanism. FIG. 10B shows the structure enclosed by the area A in FIG. 10A. FIG. 10A shows the mechanical arm 3 is at the expanded status. As shown by FIG. 10A and FIG. 10B, the mechanical arm 3 includes the arm main body 31 and further includes an arm locking mechanism 34. The arm locking mechanism 34 has a degree of freedom of stretching and retracting for locking and unlocking the arm main body 31 when the arm main body 31 is at the expanded status. Therein, in FIG. 10A and FIG. 10B, the arm locking mechanism 34 shown in solid lines stretches to lock the arm main body 31; the arm locking mechanism 34 shown in dashed lines retracts to unlock the arm main body 31.

Figure 11:
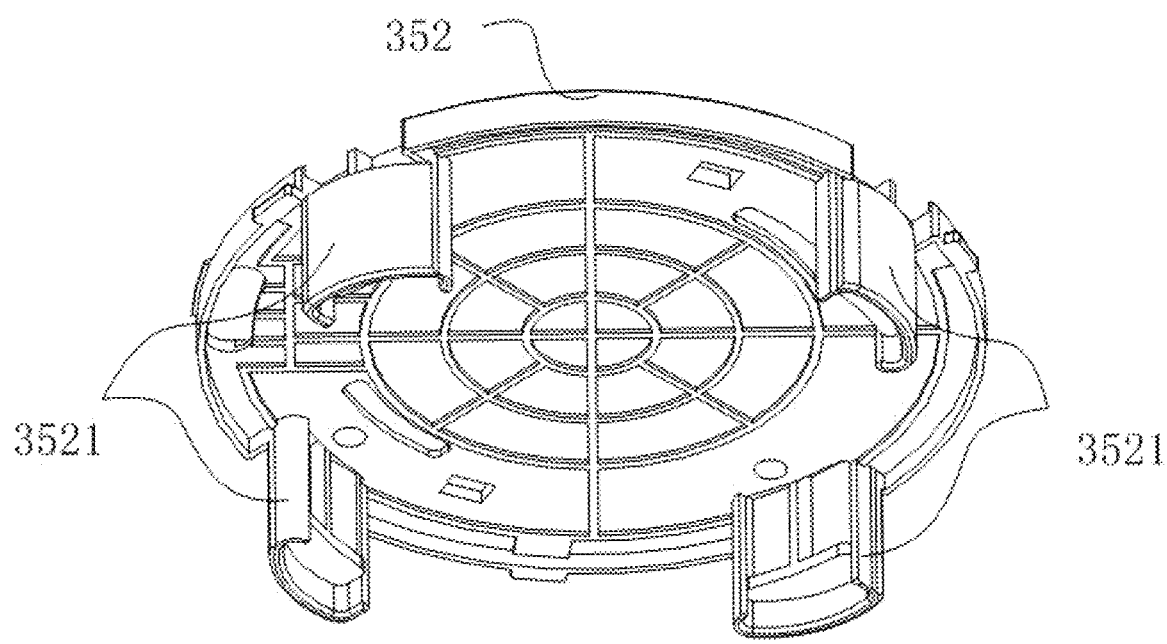
FIG. 11 is a perspective view of a turntable of the arm unlocking mechanism in the first embodiment.
Figure 12:
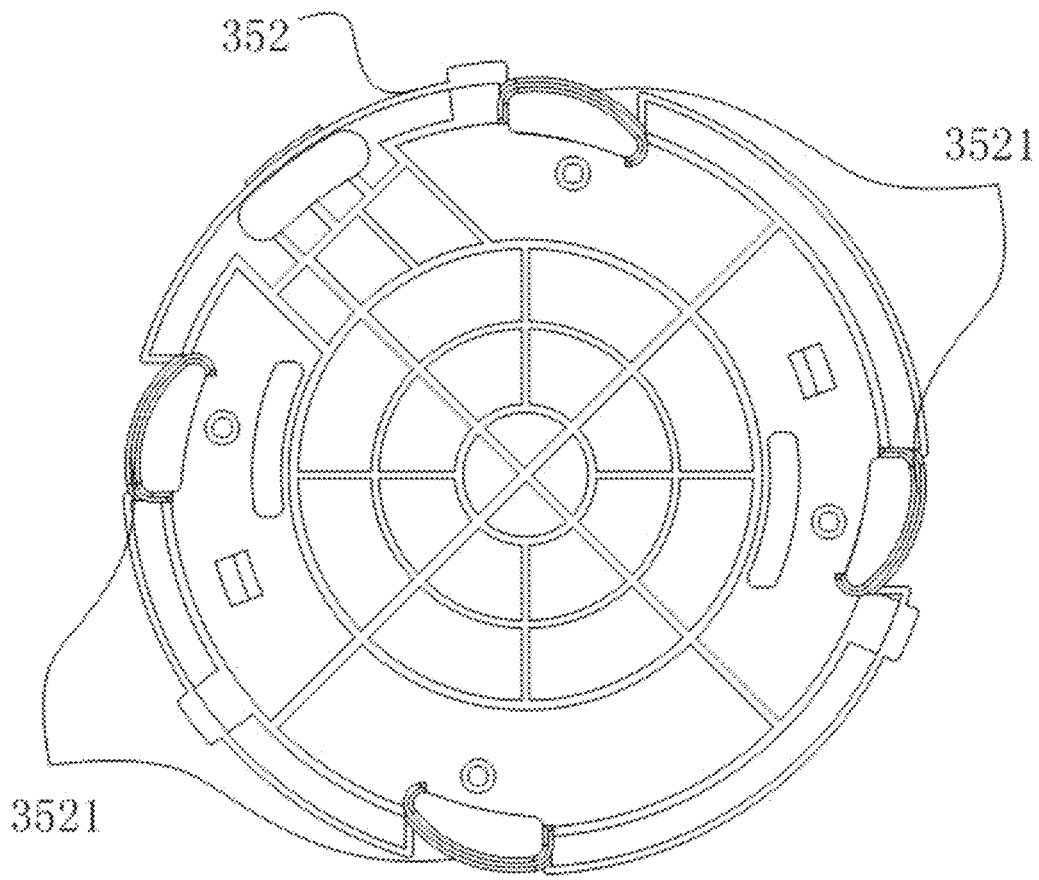
FIG. 12 is a bottom view of the turntable in the first embodiment.

As shown by FIG. 10A and FIG. 10B, the arm unlocking mechanism 35 includes a post 351 and a turntable 352. FIG. 11 shows a perspective view of the turntable 352. FIG. 12 shows a bottom view of the turntable 352. In the arm unlocking mechanism 35, the post 351 protrudes from the arm locking mechanism 34. The turntable 352 is located at a side of the arm locking mechanism 34 where the post 351 is disposed. The turntable 352 has a protrusive flange 3521 which is disposed on a surface of the turntable 352 toward the arm locking mechanism 34 and contacts the post 351. Therein, the arm locking mechanism 34 stretches and retracts along a radial direction of the turntable 352 (as indicated by the arrow in FIG. 10B). The protrusive flange 3521 extends in a rotation direction of the turntable 34 with monotone changing radius of curvature (as shown by FIG. 11 and FIG. 12). The arm locking mechanism 34 is driven to unlock the arm main body 31 by adjusting the position of the post 351 in the radial direction.

Please refer to FIG. 4, FIG. 5, FIG. 10A and FIG. 10B, the arm locking mechanism 34 is installed on the arm base 33.

The arm locking mechanism 34 receive a restoration elastic force in the radial direction. The restoration elastic force drives the arm locking mechanism 34 to move toward the position for locking the arm main body 31. A side of the protrusive flange 3521 that resists the restoration elastic force contacts the post 351, as shown by FIG. 10A and FIG. 10B. Furthermore, the direction of the restoration elastic force points to the outside of the outer shell 2 of the aircraft. The protrusive flange 3521 contacts the side of the post 351 toward the outside of the outer shell 2. The restoration elastic force can be produced by a spring that is disposed in the radial direction and abuts against the arm locking mechanism 34. As described in the foregoing about the aircraft and shown by FIG. 1A, FIG. 1B and FIG. 2, the outer shell 2 has the first opening 21 by which the arm main body 31 can swing to expand out of the outer shell 2 or retract back to the outer shell 2. The outer shell 2 includes the periphery wall 25 and the top cover 23 which is capable of rotating relative to the periphery wall 25. The first opening 21 is disposed on the periphery wall 25. The arm locking mechanism 34 is fixed at the location corresponding to the first opening 21. The turntable 352 is fixed at the inner side of the top cover 23. In an embodiment, the turntable 352 can be fixed on the top cover 23; thereby, the turntable 352 can be rotated by rotating the top cover 23.

Figure 13:
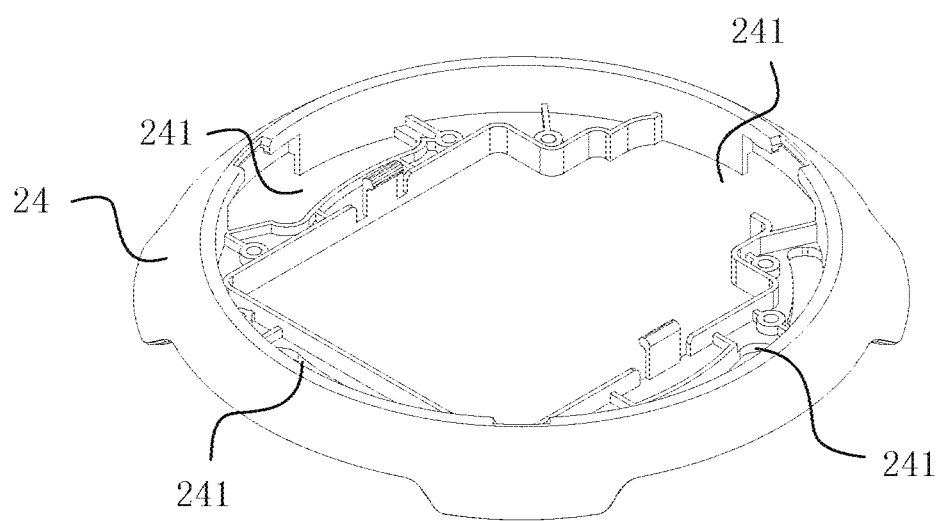
FIG. 13 is a perspective view of an engagement ring of the outer shell of the aircraft in the first embodiment.
Figure 14:
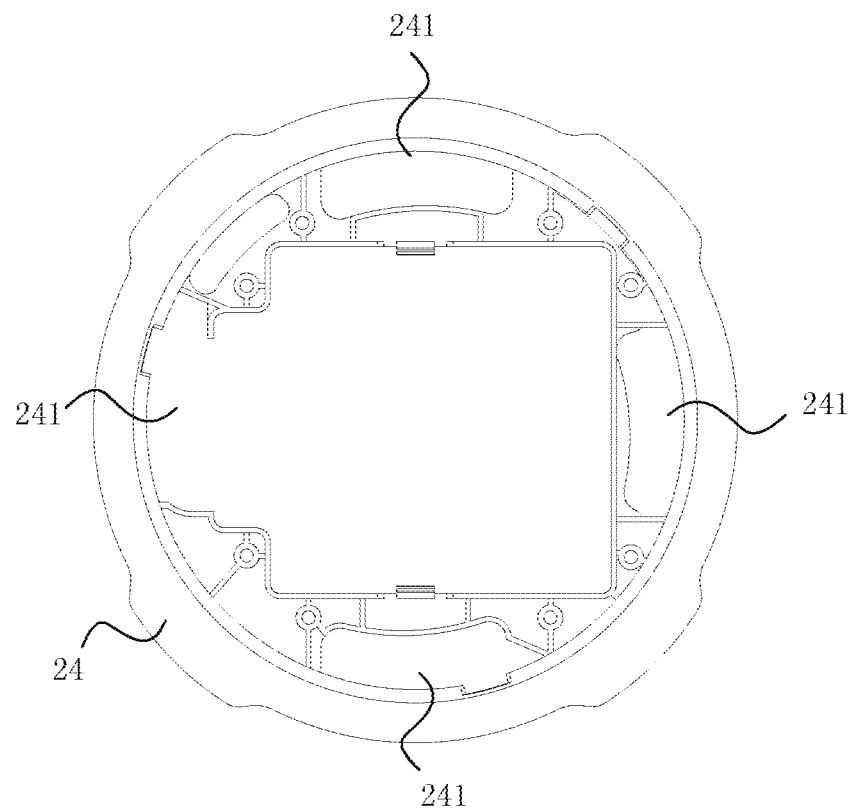
FIG. 14 is a top view of the engagement ring in the first embodiment.

FIG. 13 shows a perspective view of the engagement ring 24. FIG. 14 shows a top view of the engagement ring 24. Please refer to FIG. 1A and FIG. 2. Because the top cover 23 is spliced with the periphery wall 25 at the upper opening through the engagement ring 24, the protrusive flange 3521 of the turntable 352 fixed on the top cover 23 passes through the engagement ring 24 to contact the post 351. In the embodiment, the engagement ring 24 has a limitation opening 241. The protrusive flange 3521 passes through the limitation opening 241 so that the turntable 352 can avoid excessive rotation and the post 351 will not depart from the protrusive flange 3521.

In the arm unlocking mechanism of the embodiment, the protrusive flange extends in the rotation direction of the turntable with monotone changing radius of curvature. The protrusive flange contacts the post, so that when the turntable rotates, because of the monotone changing radius of curvature of the protrusive flange in the rotation direction of the turntable, the protrusive flange will push the post to drive the arm unlocking mechanism to move for unlocking the mechanical arm. The arm unlocking mechanism of the embodiment is simple in structure and is structurally integrated into the whole structure of the aircraft having a shape of an ellipsoid; therein, the unlocking of the mechanical arm can be achieved just by rotating the top cover.

Figure 15:
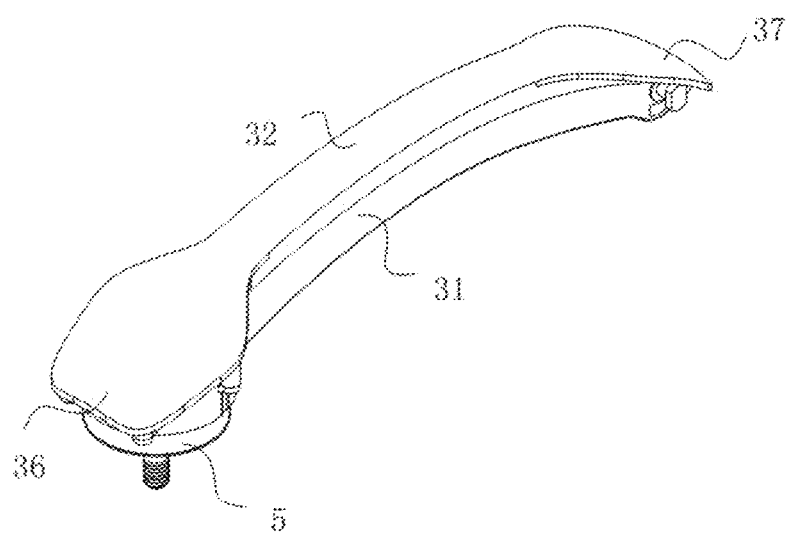
FIG. 15 is a perspective view of a mechanical arm of the aircraft in the first embodiment.

FIG. 15 shows a perspective view of the arm main body 31 of the aircraft 1. As shown by FIG. 15, in the embodiment, the width of a root portion 37 of the arm main body 31 that is installed on the framework of the aircraft 1 is less than the width of a free end 36 of the arm main body 31. In one aspect, this design can reduce the width of the opening of the outer shell 2; in another aspect, the design can produce aesthetic profiles. In the embodiment, the reason why the free end 36 is relatively wide is because the motor 5 is installed at the free end 36, which needs to reserve space for installing the motor 5. Because of the effect of the weight of the motor 5, after the motor 5 is installed, the arm main body 31 that is expanded will induce a relatively large stress at the root portion 37. Therefore, as shown by FIG. 16 that shows a sectional view of the mechanical arm, in the embodiment, the root portion 37 of the arm main body 31 is provided with a reinforcement part 38.

Figure 16:
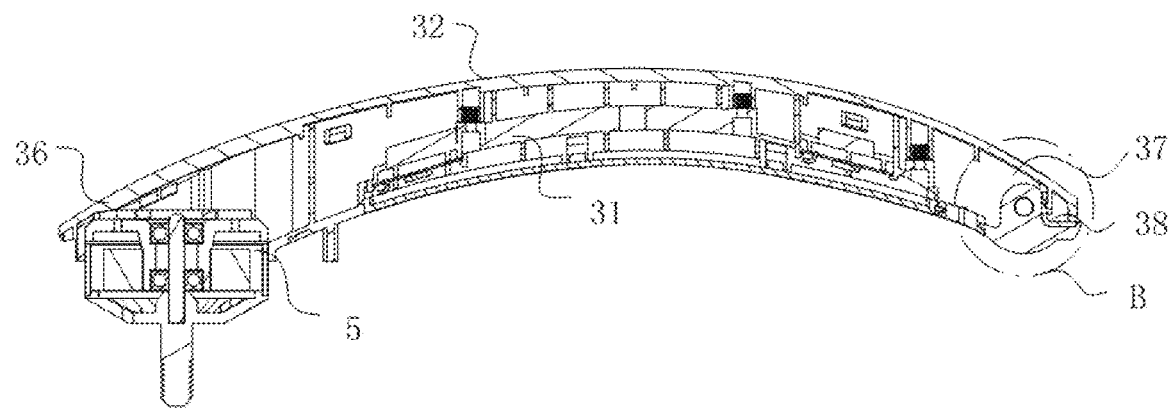
FIG. 16 is a sectional view of the mechanical arm in the first embodiment.
Figure 17:
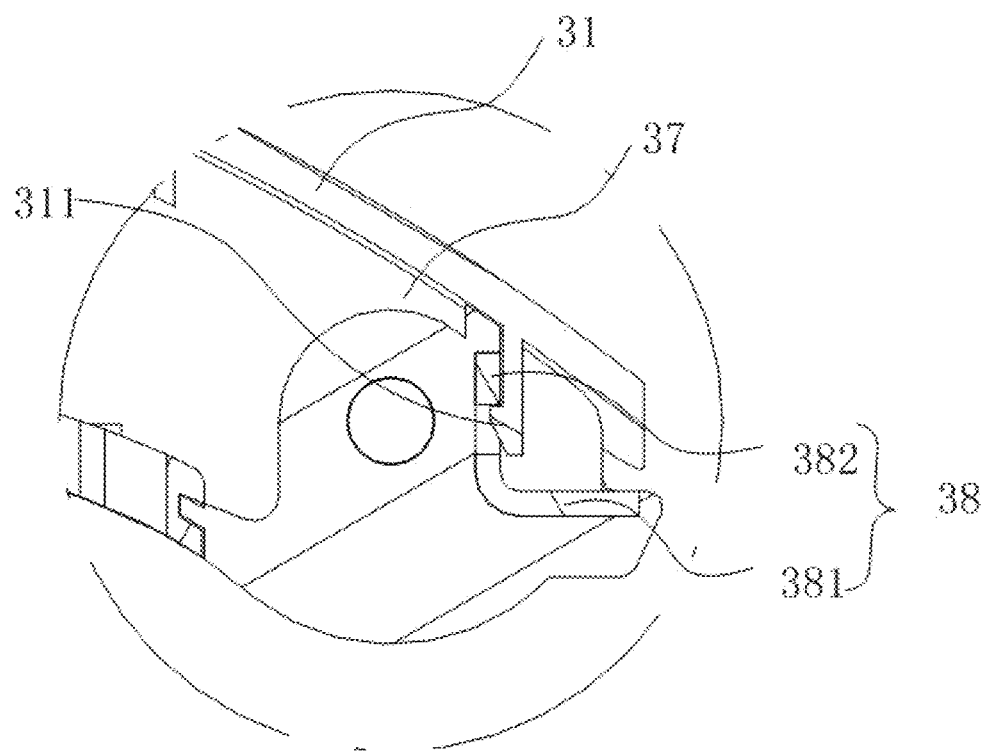
FIG. 17 is an enlarged view of the structure enclosed by the area B in FIG. 16.

FIG. 17 is an enlarged view of the structure enclosed by the area B in FIG. 16. As shown by FIG. 17, the reinforcement part 38 includes a first reinforcement wall 381 and a second reinforcement wall 382 which are perpendicular to each other and are formed in a single part. Therein, the first reinforcement wall 381 is disposed at a side of the second reinforcement wall 382 away from the free end 36 of the arm main body 31. In addition, the second reinforcement wall 382 has an open slot, which a hook 311 of the arm cover 32 hooks for fixing the arm cover 32 on the arm main body 31.

Please refer to FIG. 2, FIG. 3, FIG. 4, FIG. 15, FIG. 16 and FIG. 17, the root portion 37 of the arm main body 31 is installed on the framework structure of the aircraft through the arm base 33. The arm base 33 has the mechanical arm installation holes. The arm main body 31 is installed onto the arm base 33 through the mechanical arm installation holes and can expand and retract about the central axis of the mechanical arm installation holes.

The mechanical arm of the aircraft reinforces the bending resistance of the root portion of the mechanical arm by the reinforcement part disposed at the root portion of the mechanical arm, so that the root portion of the mechanical arm will not be damaged when the mechanical arm bears a relatively large stress. That the first reinforcement wall and the second reinforcement wall are perpendicular to each other makes the reinforcement on the strength of the root portion of the mechanical arm maximum. Because of the open slot, it is convenient to the installation of the arm cover 32 on the root portion of the mechanical arm.

Figure 18:
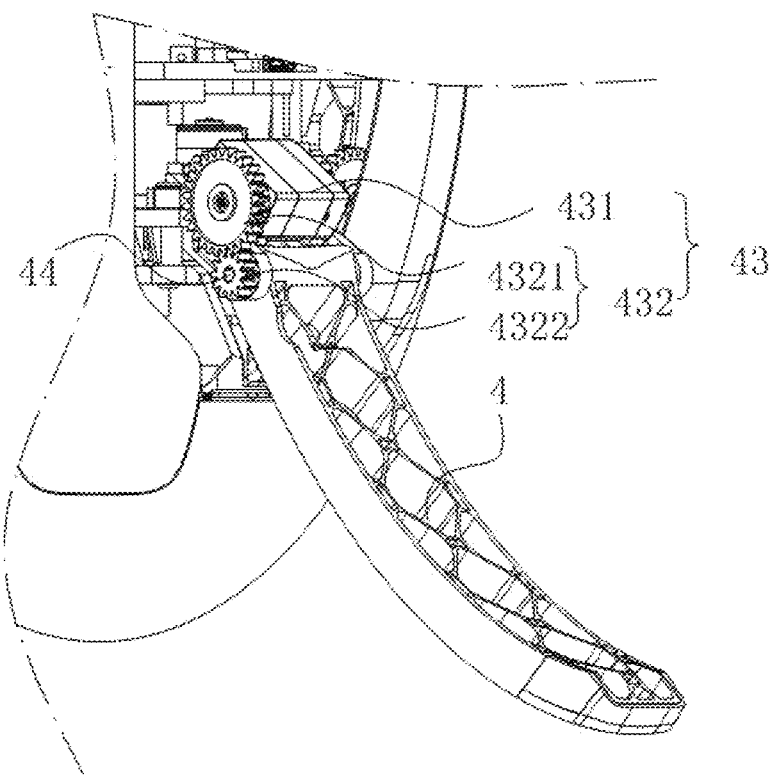
FIG. 18 is a perspective view of the leg driving mechanism of the aircraft in the first embodiment.

The second installation mechanism can further include a leg driving mechanism 43. FIG. 18 shows the leg driving mechanism 43 of the aircraft. The leg driving mechanism 43 includes a servomotor 431 and a gear set 432. Therein, the servomotor 431 is fixed on the framework 10 of the aircraft through the leg mount 131. The gear set 432 is installed on and between a rotary shaft of the servomotor 431 and a leg pivot 44 of the aircraft and is driven by the servomotor 431 to control the leg main body 41 to expand and retract.

Therein, the gear set 432 includes a first transmission gear 4321 and a second transmission gear 4322. The first transmission gear 4321 is installed on the rotary shaft of the servomotor 431 so as to rotate together with the rotary shaft of the servomotor 431. The second transmission gear 4322 is installed on the leg pivot 44 of the aircraft and engages with the first transmission gear 4321. When the first transmission gear 4321 rotates, the second transmission gear 4322 is driven by the first transmission gear 4321 to rotate to control the leg main body 41 to expand and retract.

Figure 19:
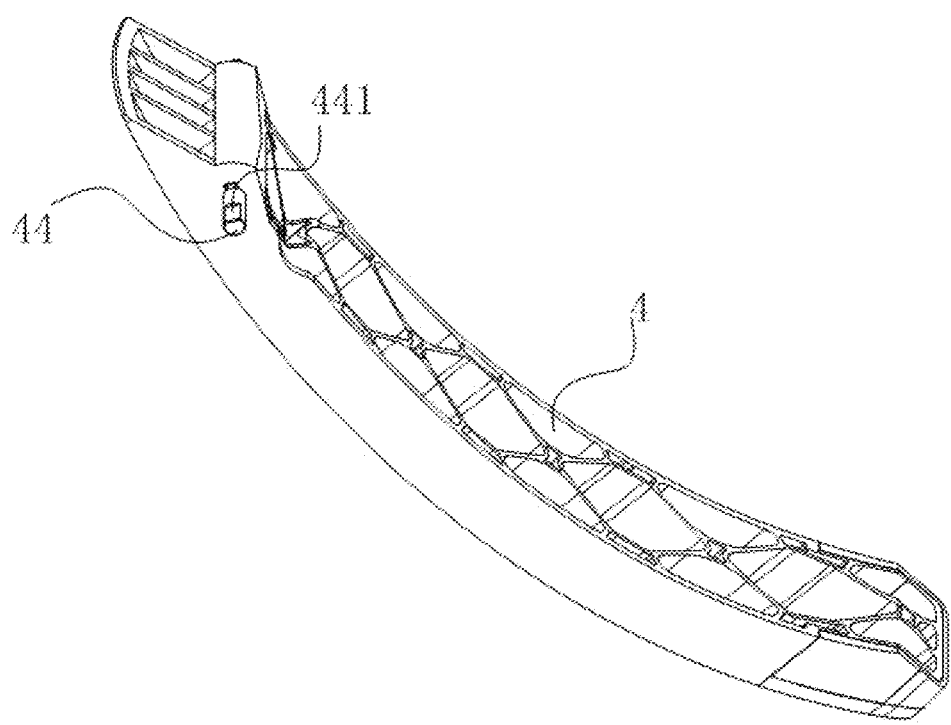
FIG. 19 is a perspective view of a leg of the aircraft in the first embodiment.

FIG. 19 shows a perspective view of the leg main body 41. As shown by FIG. 18 and FIG. 19, the leg pivot 44 of the aircraft has a limitation plane 441. Relative rotation between the second transmission gear 4322 and the leg pivot 44 of the aircraft can be avoided through the limitation plane 441, so that the leg main body 41 can rotate together with the second transmission gear 4322 to expand and retract.

Therein, as shown by FIG. 7A and FIG. 7B, the leg mount 131 includes the installation bosses 1312 used for fixing the leg main body 41 and the leg driving mechanism 43. The servomotor 431 is fixed on the installation bosses 1312. The leg pivot 44 of the aircraft is installed on the installation bosses 1312 through leg pivot installation parts.

In the leg driving mechanism of the aircraft, because the position of the rotary shaft of the servomotor remains fixed when the servomotor stops rotating, the angle of expanding and retracting of the leg is also decided. In the above embodiment, the precise control on the expanding and retracting of the leg is achieved by the kinematic linkage between the servomotor and the gear set. When the servomotor stops rotating, it ensures that under the effect of the servomotor, the leg of the aircraft will not be forced to expand and retract even when suffering an external force.

Figure 20:
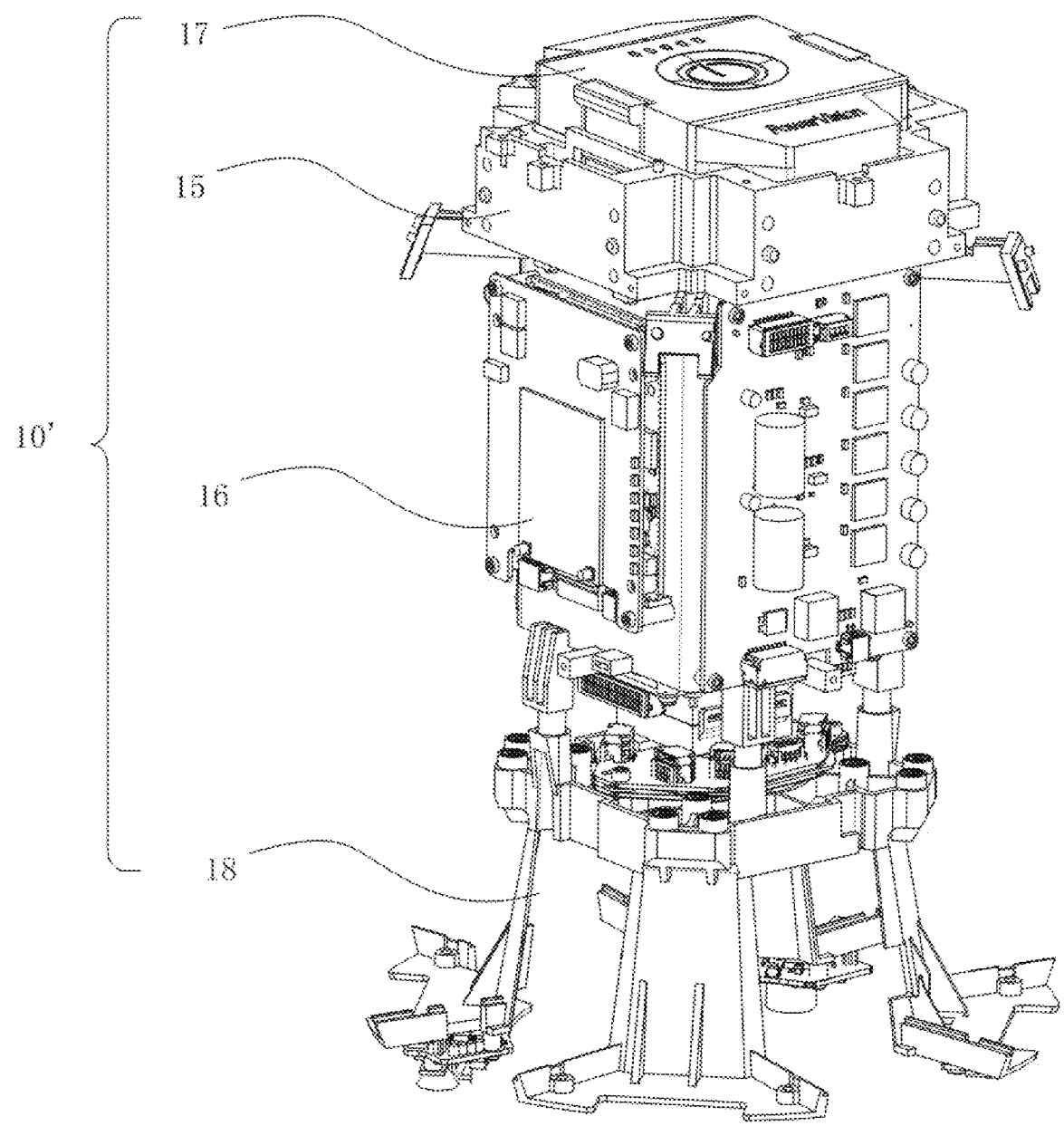
FIG. 20 is a perspective view of the structure of a framework in a second embodiment.

FIG. 20 shows a perspective view of a framework 10' used in the aircraft according to a second embodiment. The framework 10' includes a fifth framework member 15, a sixth framework member 16, a seventh framework member 17, and an eighth framework member 18. The fifth framework member 15, the sixth framework member 16, the seventh framework member 17, and the eighth framework member 18 together construct the framework 10'.

Figure 21:
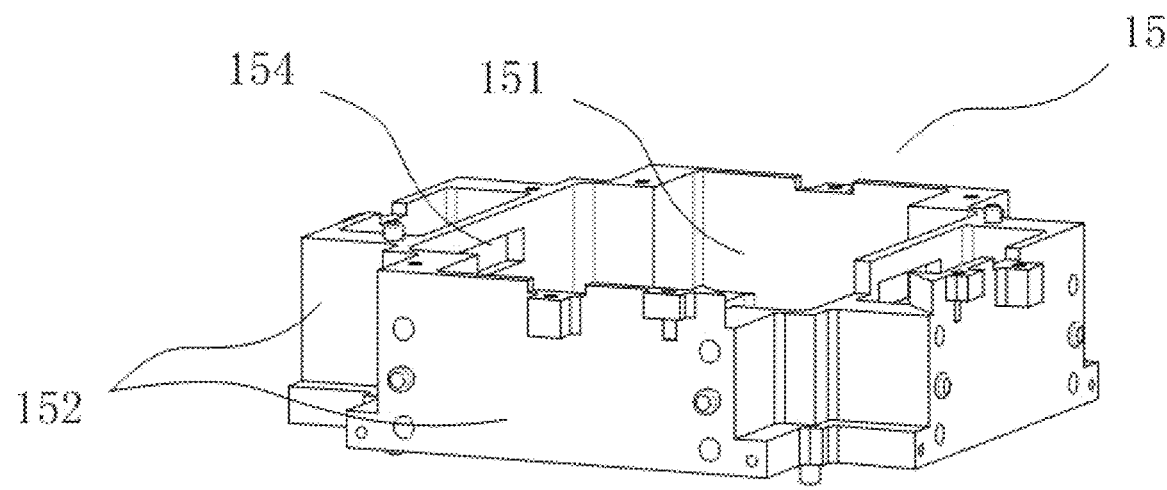
FIG. 21 is a perspective view of a fifth framework member of the framework in the second embodiment.
Figure 25:
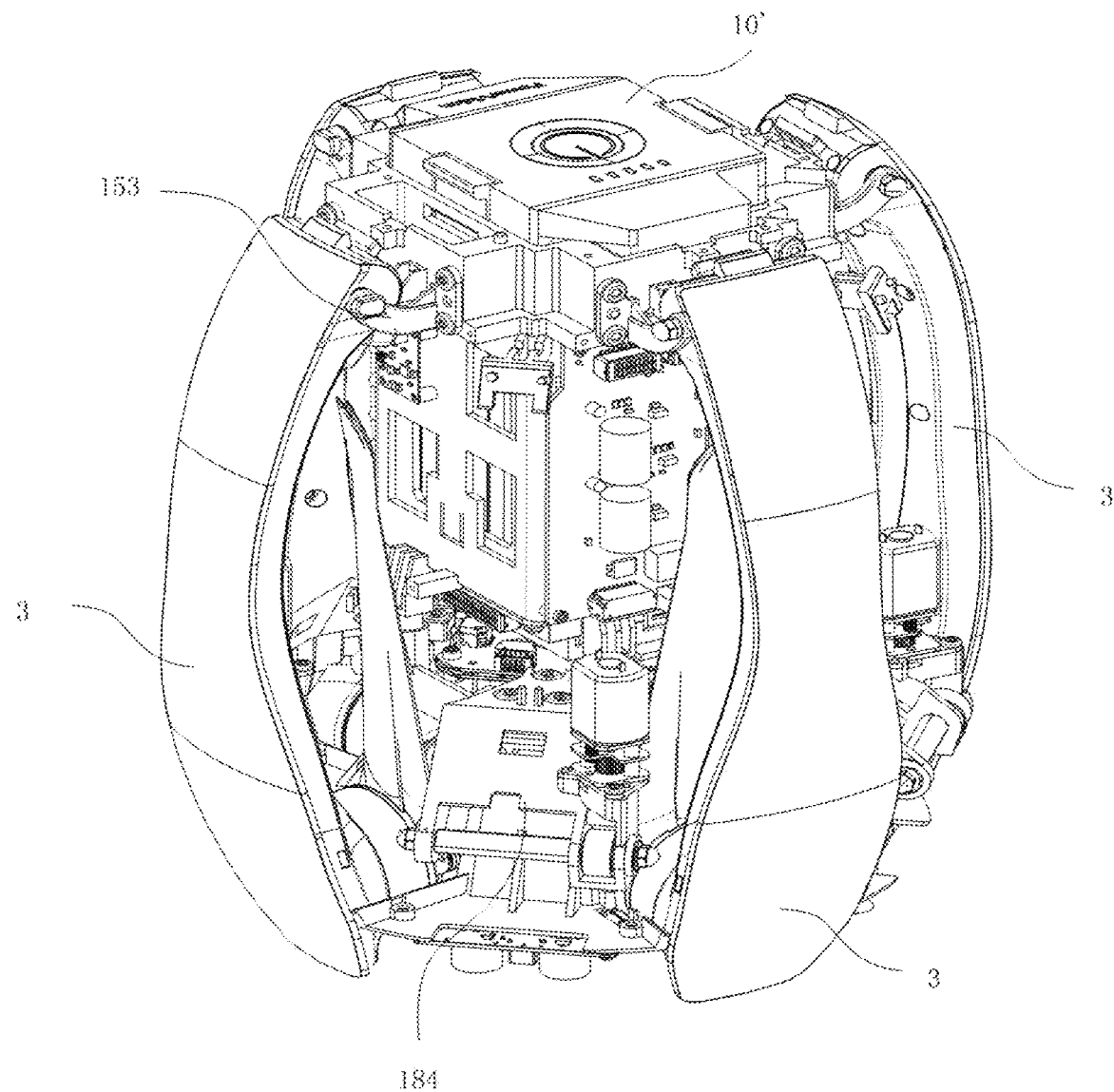
FIG. 25 is a perspective view of the aircraft in the second embodiment of which the outer shell and the legs are not shown.
Figure 26:
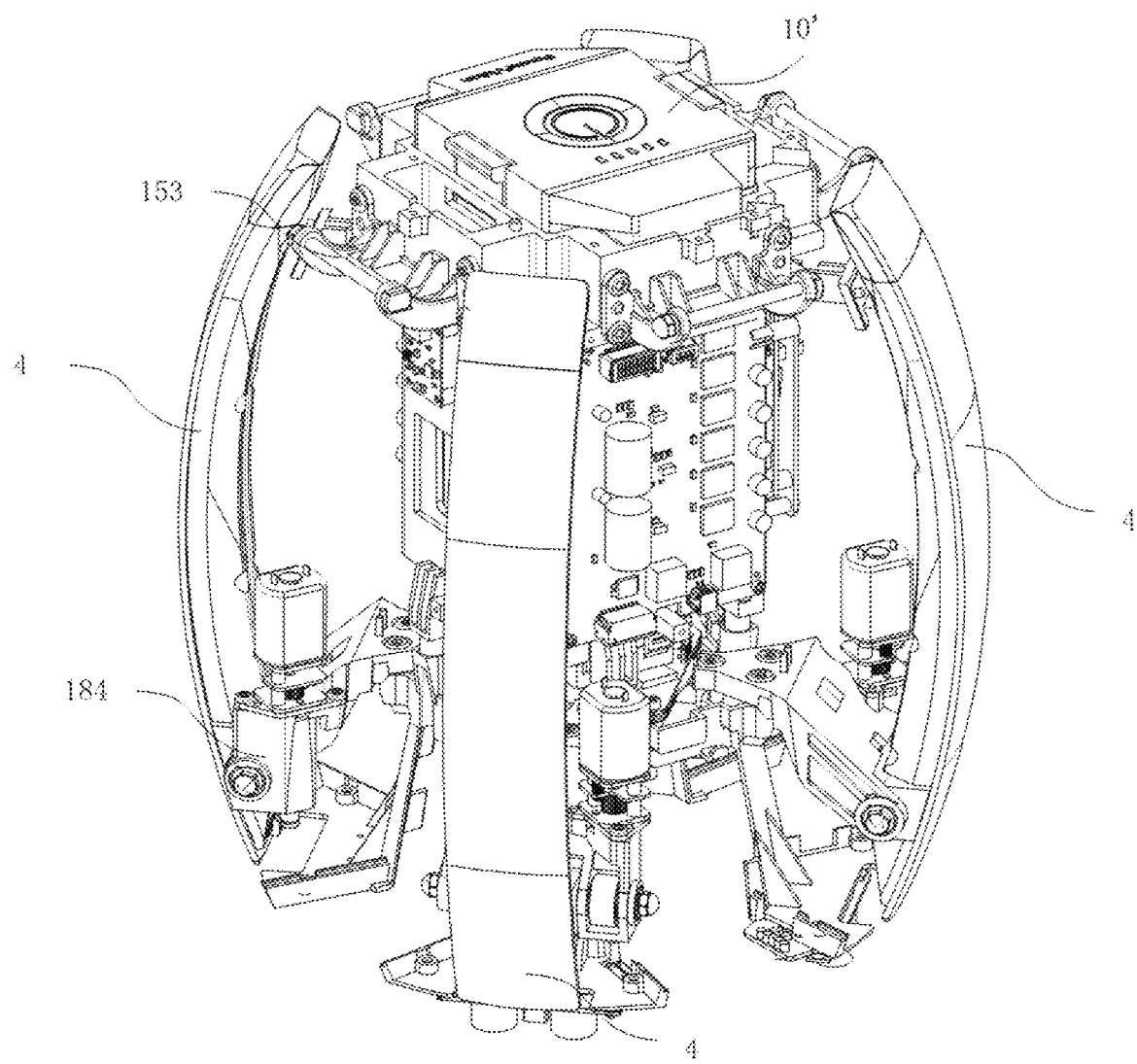
FIG. 26 is a perspective view of the aircraft in the second embodiment of which the outer shell and the mechanical arms are not shown.
Figure 27:
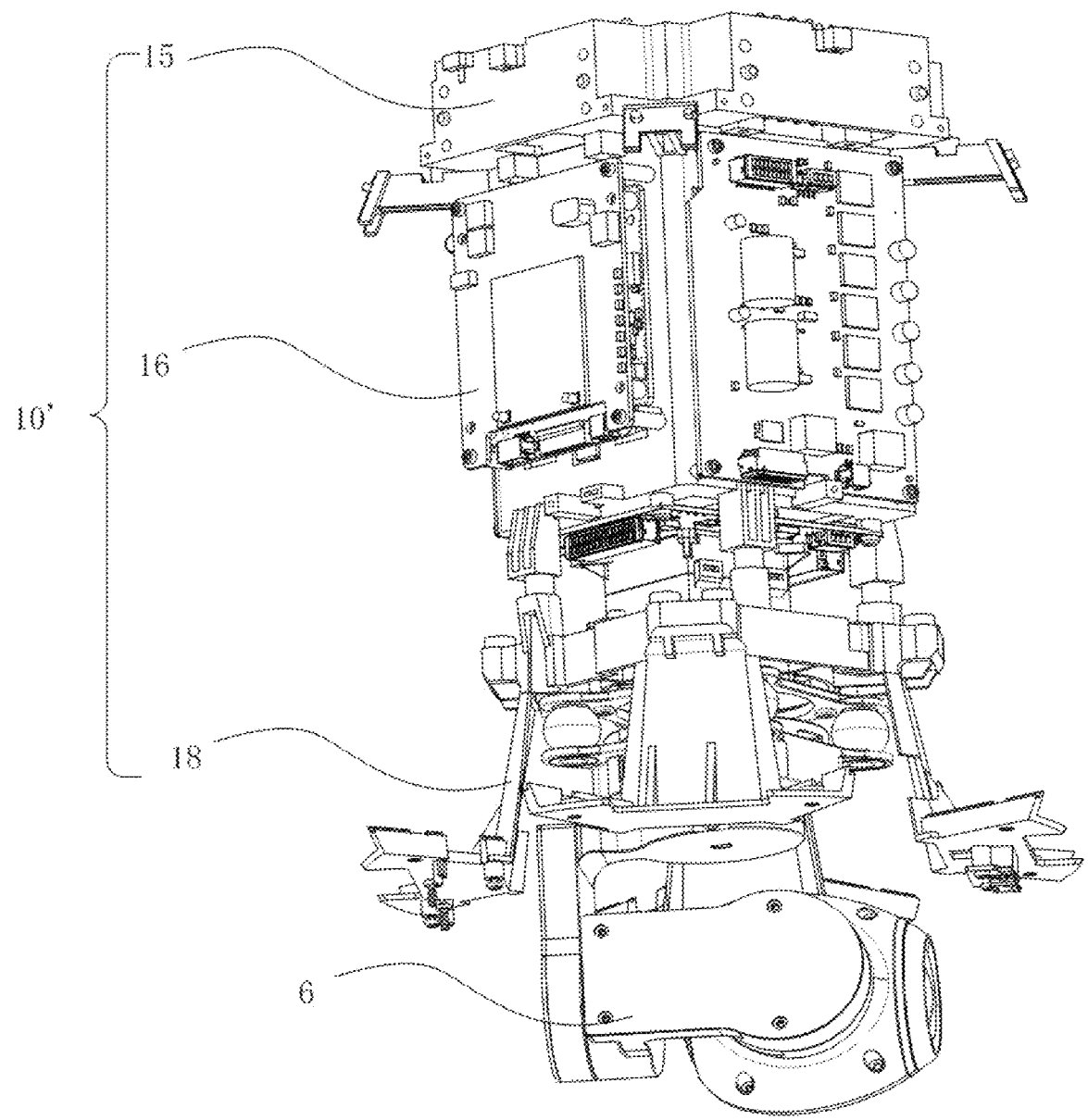
FIG. 27 is a perspective view of the aircraft equipped with a gimbal camera in the second embodiment of which the outer shell, the mechanical arms, and the legs are not shown.

FIG. 21 shows a perspective view of the fifth framework member 15 of the framework 10'. As shown by FIG. 21, the fifth framework member 15 has a side wall 152 having a cavity 151 and surrounding the cavity 151. Please also refer to FIG. 25. The outer surface of the side wall 152 forms an installation mechanism 153 for installing the mechanical arm 3. Therein, the first installation mechanism 153 can be achieved by the installation mechanism in the first embodiment, or other structures by which the mechanical arm 3 has the first degree of freedom.

The main body of the fifth framework member 15 is a long tubular structure with a cavity surrounded by the side walls 152. The side walls 152 have the same width so that the transverse section of the main body of the fifth framework member 15 is a regular polygon. The top side of the fifth framework member 15 also can be used to provide another outer shell installation location (which is used for installing the engagement ring 24 of the outer shell 2 and an upper portion of the periphery wall 25), in addition to the outer shell mount 141 of the eighth framework member 18 (which is used for installing the bottom cover 26 of the outer shell 2 and a lower portion of the periphery wall 25 thereon).

Please refer to FIG. 20 continuously. The sixth framework member 16 is connected to the bottom side of the fifth framework member 15. Therein, the sixth framework member 16 also is a long tubular structure with a cavity surrounded by the side walls. Therefore, the side walls of the sixth framework member 16 and the bottom portions of the side walls 152 of the fifth framework member 15 are connected through tightening parts.

Figure 22:
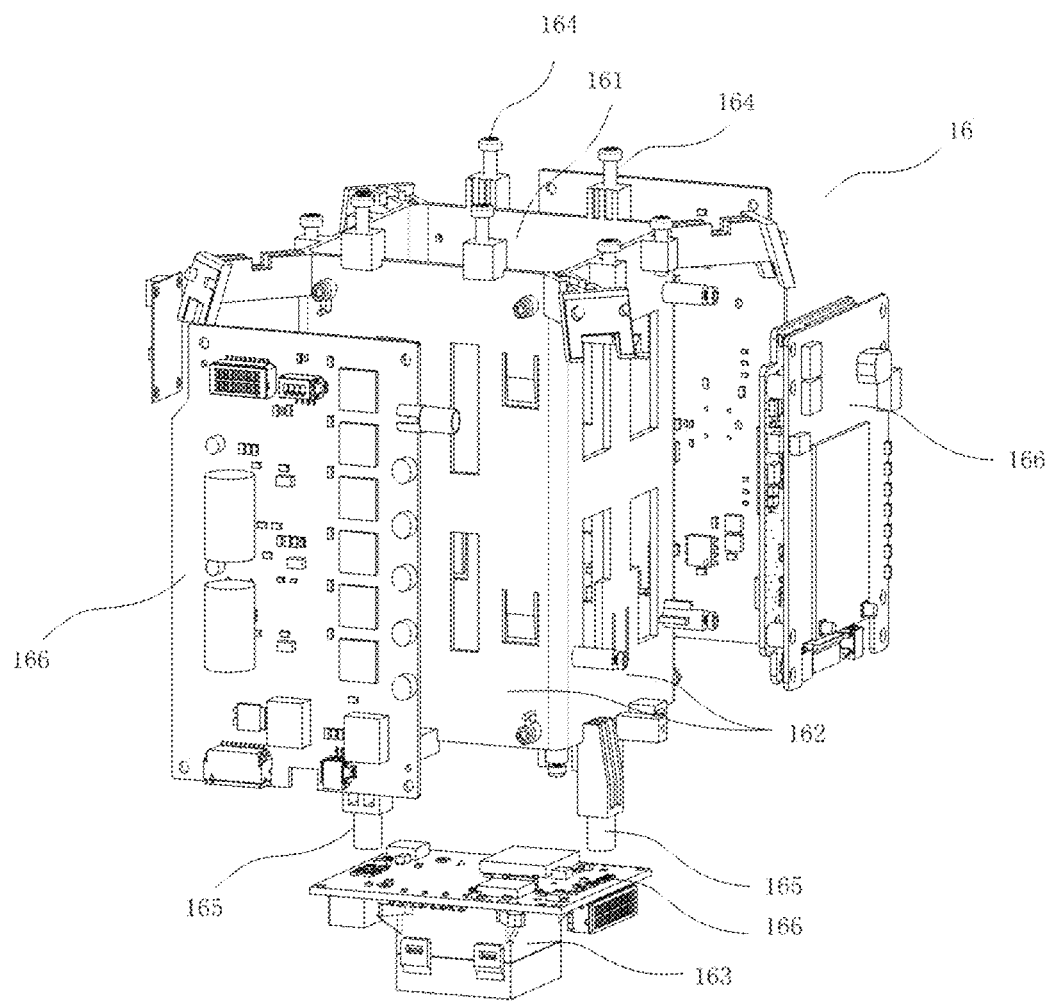
FIG. 22 is a perspective view of a sixth framework member of the framework in the second embodiment.

FIG. 22 shows a perspective view of the sixth framework member 16 of the framework 10'. As shown by FIG. 22, the sixth framework member 16 has a cavity 161 and side walls 162 surrounding the cavity 161, and a bottom plate 163 covering the bottom of the cavity 161. The bottom plate 163 is connected to the bottom of the cavity 161 through tightening parts so as to cover the bottom of the cavity 161. A plurality of installation sockets or installation holes can be disposed on the outer surfaces of the side walls 162 for installing the first controlling component and/or the second controlling component 166 of the main body thereon. The surface of the bottom plate 163 toward the cavity 161 can be used for installing the first controlling component and/or the second controlling component 166 of the main body thereon.

The transverse section of the main body of the sixth framework member 16 can have the same profile as the transverse section of the main body of the fifth framework member 15. The upper edge of the side wall 162 of the sixth framework member 16 is connected to the bottom portion of the side wall 152 of the fifth framework member 15. The lower edge of the side wall 162 of the sixth framework member 16 is connected to the eighth framework member 18 through bosses 165.

Figure 23:
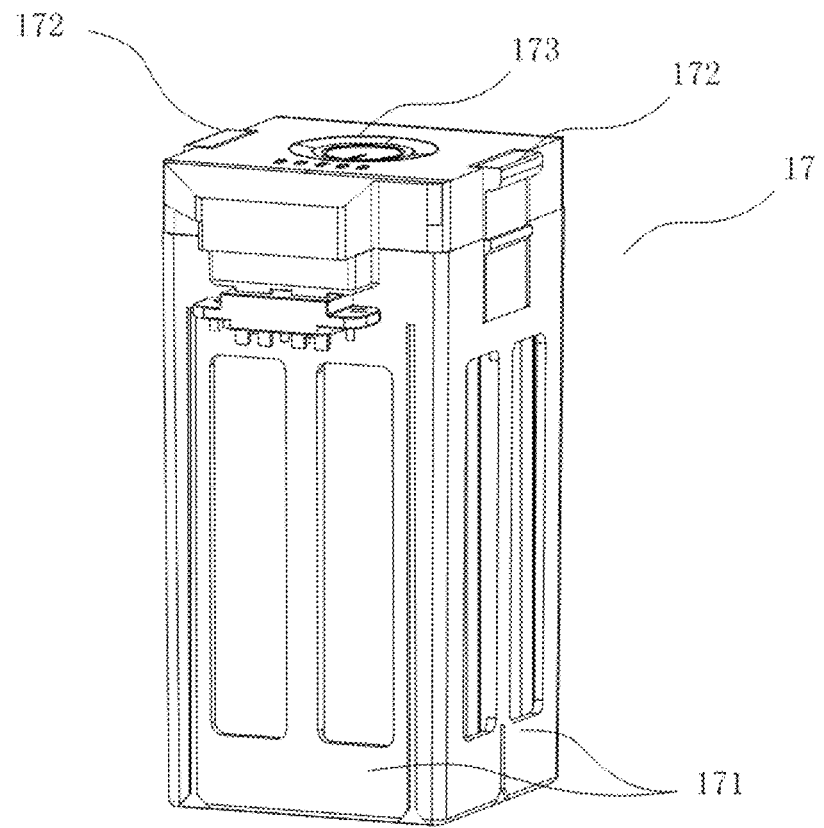
FIG. 23 is a perspective view of a seventh framework member of the framework in the second embodiment.

FIG. 23 shows a perspective view of the seventh framework member 17 of the framework 10'. As shown by FIG. 23, the seventh framework member 17 is a box structure formed by connecting side walls 171 into a circle. Lock protrusions 172 are disposed on the outer surfaces of the side walls 171 for engaging with the fifth framework member 15. Therein, the top portion of the seventh framework member 17 is inserted into the cavity 151 of the fifth framework member 15 from the bottom portion of the fifth framework member 15, so as to be fixedly connected to the side walls 152 of the fifth framework member 15 through the lock protrusions 172 on the side walls 171. The fifth framework member 15 has lock recesses 154 on the side walls 152 engaged with the lock protrusions 172.

The seventh framework member 17 is used for installing a battery 173 of the main body. The top portion of the seventh framework member 17 is inserted into the cavity 151 of the fifth framework member 15; the rest of the seventh framework member 17 is installed in the cavity 161 of the sixth framework member 16. Because the periphery and the bottom of the cavity 151 of the sixth framework member 16 are covered by the side walls 162 and the bottom plate 163, the battery in the seventh framework member 17 located in the cavity 161 can be protected well.

Figure 24:
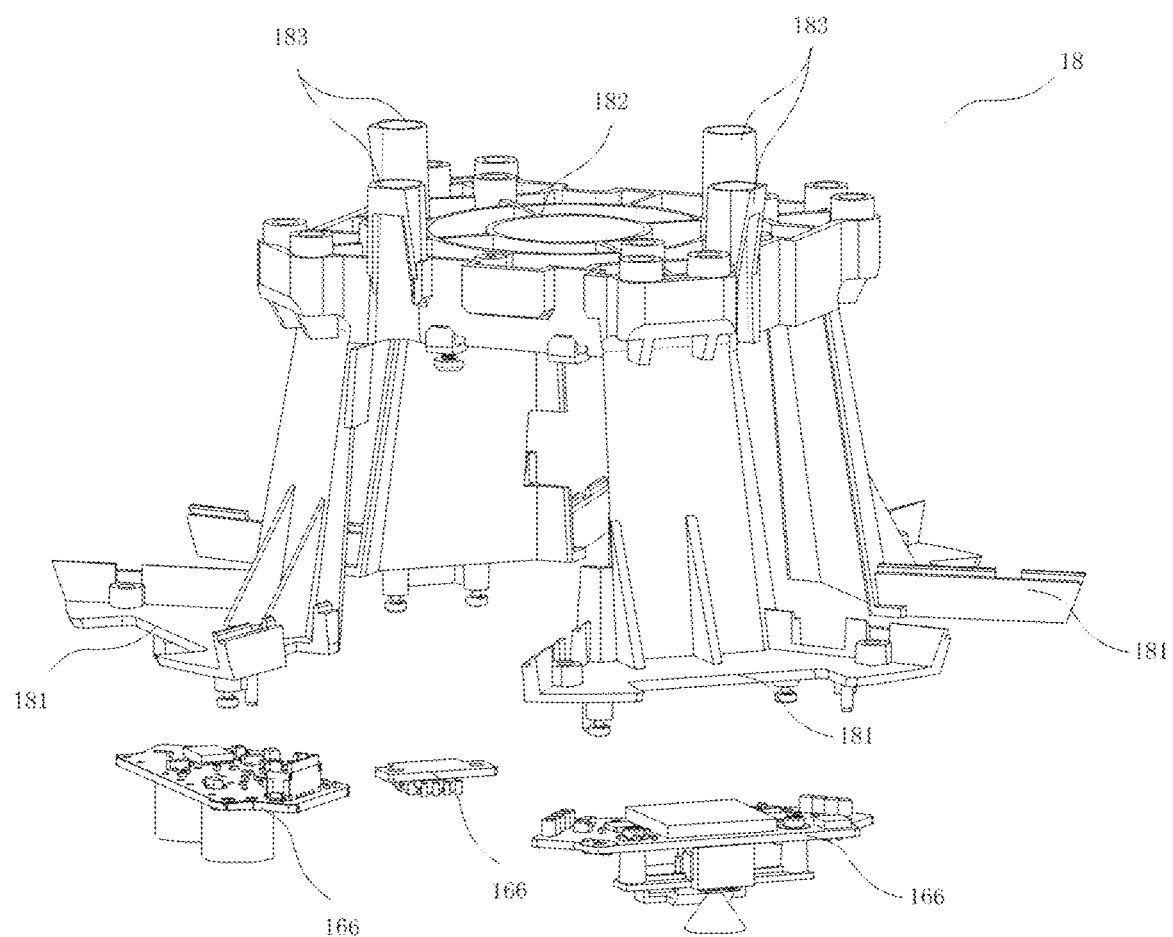
FIG. 24 is a perspective view of an eighth framework member of the framework in the second embodiment.

FIG. 24 shows a perspective view of the eighth framework member 18 of the framework 10'. As shown by FIG. 24, the eighth framework member 18 has a gimbal mount 182 and an outer shell mount 181 formed at the surroundings of the gimbal mount 182. As shown by FIG. 20, FIG. 22 and FIG. 24, bosses 165 are disposed at the bottom side of the sixth framework member 16. The eighth framework member 18 has eighth installation holes 183 at the top side of the eighth framework member 18 corresponding to the bosses 165. The eighth framework member 18 is connected to the bottom side of the sixth framework member 16 through connecting parts passing through the installation holes 183 and being fixed in the bosses 165.

In addition, the outer shell mount 181 of the eighth framework member 18 can further include a plurality of installation sockets or holes thereon for installing the first controlling component and/or the second controlling component 166 of the main body.

As shown by FIG. 24, FIG. 25, FIG. 26 and FIG. 27, the gimbal mount 182 can further include a second installation mechanism 184 at an edge thereof for installing the leg 4. Therein, the second installation mechanism can be achieved by the installation mechanism in the first embodiment, or other structures having the second degree of freedom.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An aircraft, comprising:
an outer shell; and
main body components, accommodated in the outer shell;
wherein the outer shell comprises an inner cavity and an outer surface, the outer surface forms a first opening for a mechanical arm of the aircraft to expand and retract relative to the outer shell, and the main body components comprise a first installation mechanism that is located at the first opening and allows variation of the angle of the mechanical arm relative to a gravity center axis of the aircraft;
wherein the mechanical arm comprises:
an arm main body, the arm main body being installed on the first installation mechanism and being capable of being at least partially accommodated in the first opening when the mechanical arm is retracted; and
an arm cover, the arm cover being installed on a side of the arm main body and being capable of at least partially covering the first opening when the mechanical arm is retracted.

2. The aircraft of claim 1, wherein the outer shell is provided in a form of an ellipsoid or a sphere.

3. The aircraft of claim 1, wherein the main body components comprise an aircraft framework.

4. The aircraft of claim 1, wherein the aircraft further comprises mechanical arms.

5. The aircraft of claim 4, wherein the mechanical arm can expand and retract relative to the outer shell.

6. The aircraft of claim 4, wherein installation positions of the mechanical arms are distributed around a gravity center axis of the aircraft.

7. The aircraft of claim 1, wherein the outer surface comprises a plurality of the first openings, the first openings pass through the outer surface of the outer shell, and the first openings are distributed around the aircraft in equal central angles.

8. The aircraft of claim 1, wherein the main body components comprise a controlling component for the mechanical arm, the controlling component for the mechanical arm is configured to generate an expanding signal for driving the mechanical arm to expand out of the first installation mechanism, and a retracting signal for driving the mechanical arm to retract back to the first installation mechanism, and the controlling component for the mechanical arm generates the expanding signal for the mechanical arm or the retracting signal for the mechanical arm according to a flight status of the aircraft.

9. The aircraft of claim 1, wherein the outer surface forms a second opening for a leg of the aircraft to expand and retract relative to the outer shell, and the main body components comprise an installation mechanism that is located at the second opening and allows variation of the angle of the leg relative to a gravity center axis of the aircraft.

10. The aircraft of claim 9, wherein the outer surface comprises a plurality of the second openings, the second openings pass through the outer surface of the outer shell, and the second openings are distributed around the aircraft in equal central angles.

11. The aircraft of claim 9, wherein the main body components comprise a controlling component for the leg of the aircraft, the controlling component for the leg of the aircraft is configured to generate an expanding signal for driving the leg of the aircraft to expand out of the installation mechanism and a retracting signal for driving the leg of the aircraft to retract back to the installation mechanism, and the controlling component for the leg of the aircraft generates the expanding signal or the retracting signal according to a flight status of the aircraft.

12. The aircraft of claim 9, wherein the leg comprises:
a leg main body, the leg main body being installed on the second installation mechanism and being capable of being at least partially accommodated in the second opening when the leg is retracted; and
a leg cover, the leg cover being installed on a side of the leg main body and being capable of at least partially covering the second opening when the leg is retracted.

13. The aircraft of claim 9, wherein the aircraft further comprises a gimbal camera, and the leg is disposed to be kept away from a shooting view of the gimbal camera after a flight height of the aircraft is not less than a threshold.

14. An outer shell of an aircraft, the outer shell comprising:
an inner cavity, the inner cavity having a space for at least accommodating main body components of the aircraft; and
an outer surface, the outer surface enclosing the inner cavity;
wherein the outer surface forms a first opening for a mechanical arm of the aircraft to expand and retract relative to the outer shell, and the main body components comprise a first installation mechanism that is located at the first opening and allows variation of the angle of the mechanical arm relative to a gravity center axis of the aircraft;
wherein the mechanical arm comprises:
an arm main body, the arm main body being installed on the first installation mechanism and being capable of being at least partially accommodated in the first opening when the mechanical arm is retracted; and
an arm cover, the arm cover being installed on a side of the arm main body and being capable of at least partially covering the first opening when the mechanical arm is retracted.

15. The outer shell of claim 14, wherein the outer surface is bounded by a closed envelope surface, and the closed envelope surface is formed by a smooth curved surface or a plurality of surfaces.

16. The outer shell of claim 15, wherein the smooth curved surface has a shape of an ellipsoid.

17. The outer shell of claim 14, wherein the outer surface further forms a second opening for a leg of the aircraft to expand and retract relative to the outer shell.

* * * * *